United States Patent
Sawa et al.

(10) Patent No.: US 6,309,324 B1
(45) Date of Patent: Oct. 30, 2001

(54) AUTOMATIC TRANSMISSION CONTROL SYSTEM

(75) Inventors: Kenji Sawa; Shinya Kamada, both of Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 09/449,980

(22) Filed: Nov. 26, 1999

Related U.S. Application Data

(63) Continuation of application No. 09/162,149, filed on Sep. 29, 1998.

(30) Foreign Application Priority Data

Sep. 30, 1997 (JP) .................................................. 9-284741

(51) Int. Cl.$^7$ .................................................. F16H 61/16
(52) U.S. Cl. .......................................... 477/125; 477/906
(58) Field of Search ............................. 477/62, 906, 144, 477/125

(56) References Cited

U.S. PATENT DOCUMENTS

| | | |
|---|---|---|
| 4,115,671 | 9/1978 | Iijima . |
| 4,667,541 | 5/1987 | Shimaoka et al. . |
| 4,965,730 | 10/1990 | Kurihara et al. . |
| 5,033,328 | 7/1991 | Shimanaka . |
| 5,439,426 | 8/1995 | Nakashima . |
| 5,613,921 | 3/1997 | Sugiyama et al. . |
| 5,665,027 | 9/1997 | Oba et al. . |
| 5,681,240 | 10/1997 | Sunada et al. . |
| 5,725,455 | 3/1998 | Kamada et al. . |
| 5,782,711 * | 7/1998 | Tsutsui et al. .................... 477/156 |
| 5,855,532 | 1/1999 | Sugiyama . |
| 5,879,266 | 3/1999 | Sawamura et al. . |

* cited by examiner

*Primary Examiner*—Charles A Marmor
*Assistant Examiner*—Ha Ho
(74) *Attorney, Agent, or Firm*—Nixon Peabody LLP; Donald R. Studebaker

(57) ABSTRACT

An automatic transmission control system provided with a speed sensor for monitoring an input speed to the automatic transmission, on one hand, prohibits gear shifts only to gears which are provided by alternately locking and unlocking two friction coupling elements at a timing determined essentially based on an input speed when an failure of the speed sensor occurs and, on the other hand, permits gear shifts to gears which are provided in participation of the one-way clutch by alternately locking and unlocking the two friction coupling elements, a timely alternate lock and unlock operation of the two friction coupling elements being spontaneously caused by the unlock operation of one of the two friction coupling elements and gear shifts to gears which are provided by locking one of the two friction coupling elements and unlocking the other with common pressure or unlocking one of the two friction coupling elements and locking the other with common pressure.

3 Claims, 23 Drawing Sheets

FIG. 3

| | FORWARD CLUTCH (51) | 2-4 BRAKE (54) | 3-4 CLUTCH (53) | LOW-REVERSE BRAKE (55) | REVERSE CLUTCH (52) | ONE-WAY CLUTCH (56) |
|---|---|---|---|---|---|---|
| 1ST GEAR | O | | | (O) | | O |
| 2ND GEAR | O | O | | | | |
| 3RD GEAR | O | | O | | | |
| 4TH GEAR | | O | O | | | |
| REVERSE GEAR | | | | O | O | |

( O ) ONLY IN L RANGE

FIG. 7

| RANGE | D (S) RANGE | | | | L RANGE | R RANGE |
|---|---|---|---|---|---|---|
| GEAR | 1ST | 2ND | 3RD | 4TH | 1ST | |
| 1ST SV (111) | × | × | × | ○ | ○ | ○ |
| 2ND SV (112) | × | × | × | × | ○ | ○ |
| 1ST DSV (121) | × | ○ | ○ | ○ | ○ | ○ |
| 2ND DSV (122) | × | × | ○ | ○ | × | ○ |
| 3RD DSV (123) | ○ | ○ | ○ | × | ○ | ○ |

3RD GEAR

FIG. 23

| GEAR SHIFT | LOCKED ELEMENT | UNLOCKED ELEMENT | TIMELY ALTERNATE LOCK/UNLOCK WITHOUT USING A TURBINE SPEED |
|---|---|---|---|
| 1 - 2 | 2-4B | OWC | P |
| 1 - 3 | 3-4C | OWC | P |
| 1 - 4 | 2-4B/3-4C | FWD/OWC | IP (NO 4TH GEAR) |
| 2 - 1 | OWC | 2-4B | P |
| 2 - 3 | 3-4C | 2-4B | P |
| 2 - 4 | 3-4C | FWD | IP (NO 4TH GEAR) |
| 3 - 1 | OWC | 3-4C | P |
| 3 - 2 | 2-4B | 3-4C | IP |
| 3 - 4 | 2-4B | FWD | P (NO 4TH GEAR) |
| 4 - 1 | FWD/OWC | 2-4B/3-4C | IP |
| 4 - 2 | FWD | 3-4C | IP |
| 4 - 3 | FWD | 2-4B | IP |

FIG. 24

POWER-ON STATE

| | | GEAR AFTER GEAR SHIFT | | | |
|---|---|---|---|---|---|
| | | 1ST GEAR | 2ND GEAR | 3RD GEAR | 4TH GEAR |
| GEAR BEFORE GEAR SHIFT | 1ST GEAR | | 2 - 4B (1ST DSV) | 3 - 4C (2ND DSV) | 2 - 4B (1ST DSV) 3 - 4C (2ND DSV) |
| | 2ND GEAR | 2 - 4B (1ST DSV) | | 3 - 4C (2ND DSV) | 3 - 4C (2ND DSV) |
| | 3RD GEAR | 3 - 4C (2ND DSV) | 3 - 4C (2ND DSV) | | 2 - 4B (1ST DSV) |
| | 4TH GEAR | 2 - 4B (1ST DSV) 3 - 4C (2ND DSV) | 3 - 4C (2ND DSV) | 2 - 4B (1ST DSV) | |

POWER-OFF STATE

| | | GEAR AFTER GEAR SHIFT | | | |
|---|---|---|---|---|---|
| | | 1ST GEAR | 2ND GEAR | 3RD GEAR | 4TH GEAR |
| GEAR BEFORE GEAR SHIFT | 1ST GEAR | | 2 - 4B (1ST DSV) | 3 - 4C (2ND DSV) | 2 - 4B (1ST DSV) 3 - 4C (2ND DSV) |
| | 2ND GEAR | (L/R) (1ST DSV) | | 3 - 4C (2ND DSV) | 3 - 4C (2ND DSV) |
| | 3RD GEAR | (L/R) (1ST DSV) | 2 - 4B (1ST DSV) | | 2 - 4B (1ST DSV) |
| | 4TH GEAR | (L/R) (1ST DSV) | FWD (3RD DSV) | FWD (3RD DSV) | |

AUTOMATIC TRANSMISSION CONTROL SYSTEM

This application is a Continuation of prior application Ser. No. 09/162,149 filed Sep. 29, 1998 which is currently pending.

BACKGROUND OF THE INVENTION

1. Field of the invention

This invention relates to a control system for an automatic transmission for vehicles, and, more particularly, to an automatic transmission control system in which a timing at which two friction coupling elements are alternately locked and unlocked to provide a specific gear is determined based on a turbine speed.

2. Description of Related Art

Typically, an automatic transmission for an automobile has a torque converter and a transmission gear mechanism including a plurality of friction coupling elements, such as clutches and brakes, which are selectively locked and unlocked to place automatically the automatic transmission into desired gears according to driving conditions. In such an automatic transmission, a target gear to which the automatic transmission is shifted is ordinarily determined according to driving conditions including a vehicle speed and an engine load or throttle opening. Specifically, the target gear is determined based on predetermined gear shift patterns so as to become higher with an increase in vehicle speed and/or a decrease in engine load. Selectively locking and unlocking the frictional coupling elements is controlled by means of a hydraulic control circuit such as to place the transmission gear mechanism in the target gear. In this instance, in order to prevent or significantly reduce shift shock, locking or unlocking an friction coupling element is controlled not to be momentarily achieved but to progress gradually with slippage so that the speed of a turbine of the torque converter (which is hereafter referred to as the turbine speed) smoothly changes to a speed to be attained at completion of a gear shift following a target speed during the gear shift. Such a friction coupling element locking/unlocking control is known from, for example, Japanese Unexamined Patent Publication No. 1-1 99083. Further, during, for example, a specific gear shift which is provided as result of alternately locking and unlocking specific two friction coupling elements, either one of the two friction coupling elements is locked or unlocked ahead of unlocking or locking the other one to provide an inertia phase. In the inertia phase, hydraulic pressure for locking the friction coupling element is feedback controlled to rise gradually such that the turbine speed drops to a specified turbine speed when the gear is up-shifted or rises to a specified turbine speed when the gear is down-shifted and the two friction coupling element is completely locked and unlocked timely when the specified turbine speed is attained or almost attained. This control prevents a coincidental lock or interlock of the two friction coupling elements which result in an occurrence of shift shock.

In order to cause timely the alternate lock and unlock operation of the two friction coupling elements to provide the specific gear shift, it is necessary to detect a turbine speed. If a meters associated to turbine speed, such as a turbine speed sensor, breaks down, it is impossible to determine a timing at which locking or unlocking the other friction coupling element is to commence, as a result of which an untimely lock or unlock of the other friction coupling element occurs with an adverse effect of causing interlock or shift shock and an abrupt rise in engine speed.

SUMMARY OF THE INVENTION

It is an object of the invention to provide a control system for an automatic transmission which causes a gear shift without producing shift shocks and putting a driver and passengers unpleasant feeling.

The control system of the invention is applied to an automatic transmission of the type having a transmission gear mechanism equipped with a torque converter and a plurality of hydraulically operated friction coupling elements, such as clutches and brakes, which are selectively locked and unlocked to change a power transmission path so as to place the automatic transmission into desired available gears according to scheduled gear shift patterns defined as maps based on vehicle driving conditions. The available gears includes a first group of gears which are provided by locking one of specific two hydraulically operated friction coupling elements and unlocking another specific hydraulically operated friction coupling elements and a second group of gears which are provided by locking only one of the hydraulically operated friction coupling elements. The automatic transmission control system comprises speed monitoring means for monitoring an input speed to the transmission gear mechanism, i.e. a speed of a turbine of the torque converter, hydraulic control circuit means for hydraulically locking and unlocking the hydraulically operated friction coupling elements to provide any one of the available gears, and control means comprising a microcomputer programmed to determine one of the available gears to which the automatic transmission is shifted according to the scheduled gear shift pattern selected based on a driving condition, to detect an failure of the input speed monitoring means based on the input speed, and to control the hydraulic control circuit means so as to prohibit a gear shift only to the first group of gears when detecting a failure of the input speed monitoring means.

The gear shift to be prohibited may be upshifts to the first group of gears. In this case, the automatic transmission control system unlocks the other specific hydraulically operated friction coupling element at a timing that the input speed drops and reaches a specified speed. The gear shift to be prohibited may be downshifts to the first group of gears made with an accelerator pedal remaining released. In this case, the automatic transmission control system unlocks the other specific hydraulically operated friction coupling element at a timing that the input speed rises and reaches a specified speed. The gear shift to be prohibited may further be downshifts to said first group of gears made with an accelerator pedal remaining stepped down. In this case, the automatic transmission control system controls a locking timing of one of the specific two hydraulically operated friction coupling elements based on the input speed during a gear shift to the first group of gears.

With the automatic transmission control system of the invention by which, when a failure of the input speed monitoring means is detected, a gear shift to the first group of gears which are provided by causing alternate lock and unlock operation of the specific two hydraulically operated friction coupling elements is prohibited while a failure of the input speed monitor is detected, there is no occurrence of interlock between the two hydraulically operated friction coupling elements due to untimely alternate lock and unlock operation of the two hydraulically operated friction coupling elements and an abrupt rise in engine speed which are felt as shift shocks by the driver and passengers. However, when the gear shift to one of the first group gears provided by causing alternate lock and unlock operation of the two hydraulically operated friction coupling elements is permitted when it is accompanied by actuating or releasing operation of the one-way clutch. Since the one-way clutch is spontaneously locked or released by a reversal in rotational direction of rotational elements of planetary gear mechanism occurring with progress of locking or unlocking operation of the other friction coupling element and the alternate lock and unlock operation of the two hydraulically operated friction coupling elements is timely caused without using an input speed, consequently, the gear shift is preferred to be permitted.

The automatic transmission control system of the invention may be applied to an automatic transmission of the type having a transmission gear mechanism equipped with a torque converter and a plurality of hydraulically operated friction coupling elements which are selectively locked and unlocked to change a power transmission path including a one-way clutch so as to place the automatic transmission into desired available gears according to scheduled gear shift patterns defined as maps based on vehicle driving conditions. The available gears include a first group of gears which are provided by locking one of specific two of the hydraulically operated friction coupling elements and unlocking another specific hydraulically operated friction coupling element and a second group of gears which are provided by locking only one of the hydraulically operated friction coupling elements and actuating the one-way clutch.

According to this embodiment, when a failure of the input speed monitoring means is detected, the control system prohibits a gear shift to one of the first group of gears which is provided by alternate lock and unlock operation of the two hydraulically operated friction coupling elements and, however, makes it relatively hard to cause timely lock or unlock operation of one hydraulically operated friction coupling element relative to unlock or lock operation of the other hydraulically operated friction coupling element without using an input speed. Accordingly, there is no occurrence of interlock between the two hydraulically operated friction coupling elements due to untimely alternate lock and unlock operation of the two hydraulically operated friction coupling elements and an abrupt rise in engine speed which are felt as shift shocks by the driver and passengers if the gear shift were permitted while the input speed monitoring means is out of order.

The automatic transmission control system of the invention may further be applied to an automatic transmission of the type having a transmission gear mechanism equipped with a torque converter and a plurality of hydraulically operated friction coupling elements which are selectively locked and unlocked to change a power transmission path including a one-way clutch so as to place the automatic transmission into desired available gears according to scheduled gear shift patterns defined as maps based on vehicle driving conditions. The friction coupling elements include at least a first hydraulically operated friction coupling element provided with a single pressure chamber, a second hydraulically operated friction coupling element provided with locking and unlocking pressure chambers which is locked while only the locking pressure chamber is supplied with pressure and a third hydraulically operated friction coupling element provided with a single pressure chamber in communication with the unlocking pressure chamber of the second hydraulically operated friction coupling element, and the available gears include a first group of gears which are provided by locking one of the first to third hydraulically operated friction coupling elements and unlocking another one of the first to third hydraulically operated friction coupling elements and a second group of gears which are provided by locking only one of the first to third hydraulically operated friction coupling elements and actuating the one-way clutch.

According to this embodiment, when a failure of the input speed monitoring means is detected, the control system prohibits a gear shift to one of the first group of gears which is provided by alternate lock and unlock operation of the first and second hydraulically operated friction coupling elements while the third hydraulically operated friction coupling element and a gear shift to another one of the first group of gears which alternate lock and unlock operation of the second and third hydraulically operated friction coupling elements while the first hydraulically operated friction coupling element. Because both first and third hydraulically operated friction coupling elements are in communication with the unlocking pressure chamber of the second hydraulically operated friction coupling element, it possibly occurs that the second hydraulically operated friction coupling element is unlocked by supply of pressure to its unlocking pressure chamber simultaneously with locking the first to the third hydraulically operated friction coupling elements or that the second hydraulically operated friction coupling element is locked by discharge of pressure from its unlocking pressure chamber simultaneously with unlocking the first or the third hydraulically operated friction coupling elements. Timely alternate lock and unlock operation of the two hydraulically operated friction coupling elements can be caused without using an input speed in some cases and is, however, impossible according, for example, to conditions of supply and discharge of locking pressure from the the locking pressure of the second hydraulically operated friction coupling element or to difference between setting levels of locking pressure for the first and third hydraulically operated friction coupling elements and unlocking pressure for the second hydraulically operated friction coupling element. Consequently, it is preferred to prohibit alternate lock and unlock operation of the second hydraulically operated friction coupling element and the first or the third hydraulically operated friction coupling element. On the other hand, for a gear shift to one of the first gears which is provided by unlocking the third hydraulically operated friction coupling element while the first hydraulically operated friction coupling element remains locked, the one-way clutch as a fourth hydraulically operated friction coupling element is locked, In this case, locking the forth hydraulically operated friction coupling element is spontaneously timed as the third hydraulically operated friction coupling element is unlocked. Accordingly, it is preferred to permit the gear shift accompanied by unlock and lock of the third and fourth hydraulically operated friction coupling elements, respectively. As a result, a gear shift from a gear provided by locking the first and the third hydraulically operated friction coupling element is permitted not to a gear provided by locking the second and the third hydraulically operated friction coupling element or to a gear provided by locking the first and the second hydraulically operated friction coupling element but only to a gear provided by locking the first and the fourth hydraulically operated friction coupling element.

BRIEF DESCRIPTION OF THE DRAWINGS

The above and other objects and features of the present invention will be clearly understood from the following description with respect to a preferred embodiment thereof when considered in conjunction with the accompanying drawings, in which:

FIG. 3 is a table showing operation of friction coupling elements in various available gears;

FIG. 7 is a table showing operation of the solenoid valves in the hydraulic control circuit of FIG. 4 in various available gears in given ranges;

FIG. 23 is a table summarizing combinations of tow friction coupling elements which are alternately locked and unlocked to cause various gear shifts; and FIG. 24 is tables summarizing combinations of a friction coupling element which slips in the inertia phase and a duty solenoid valve for supplying pressure to the friction coupling element for the power-on state and the power-off state.

DETAILED DESCRIPTION OF THE EMBODIMENTS

It is to be noted that the term "front" used in the following description shall means and refer to a side close to the engine and the term "rear" used in the following description shall mean and refers to a side remote from the engine.

Figure 1:
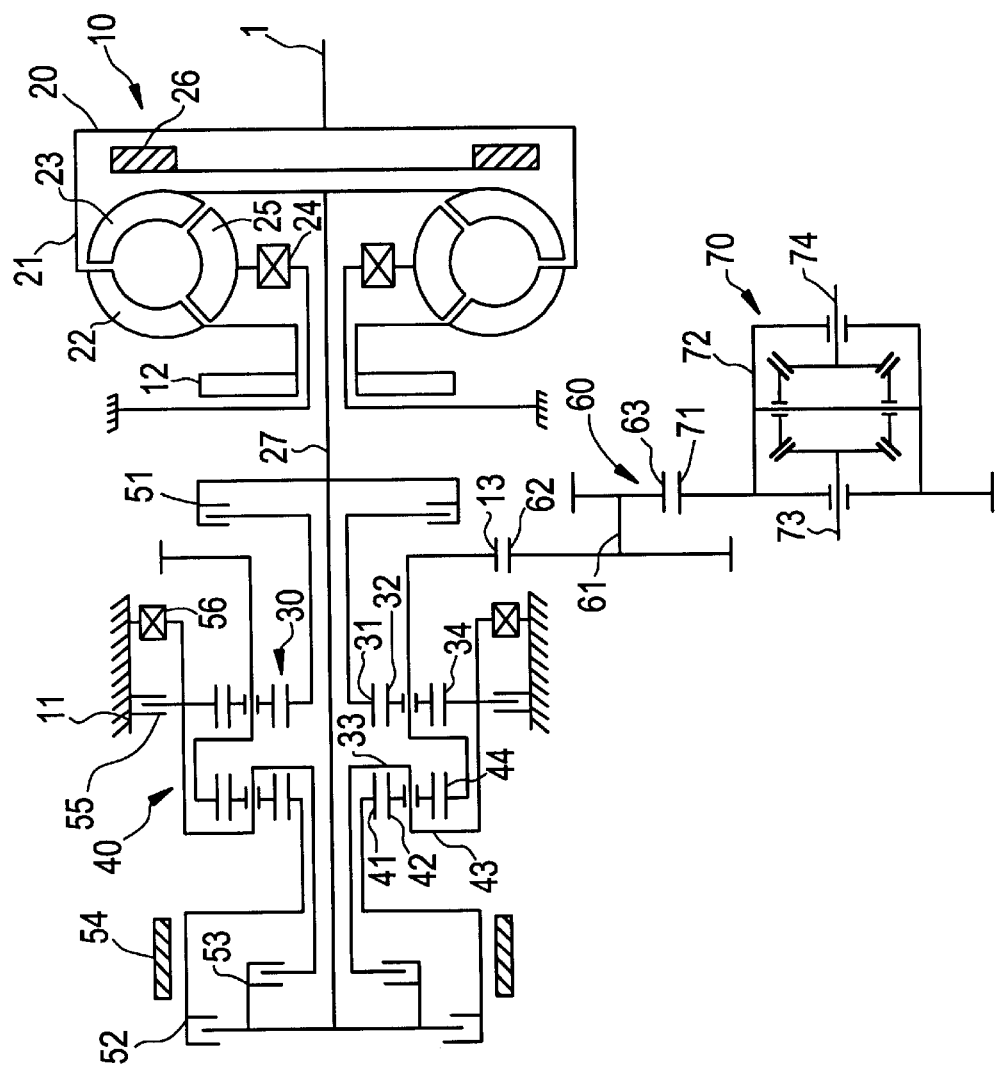
FIG. 1 is a skeleton illustration showing schematically an overall mechanical structure of an automatic transmission which is controlled by a control system of the invention.
Figure 2:
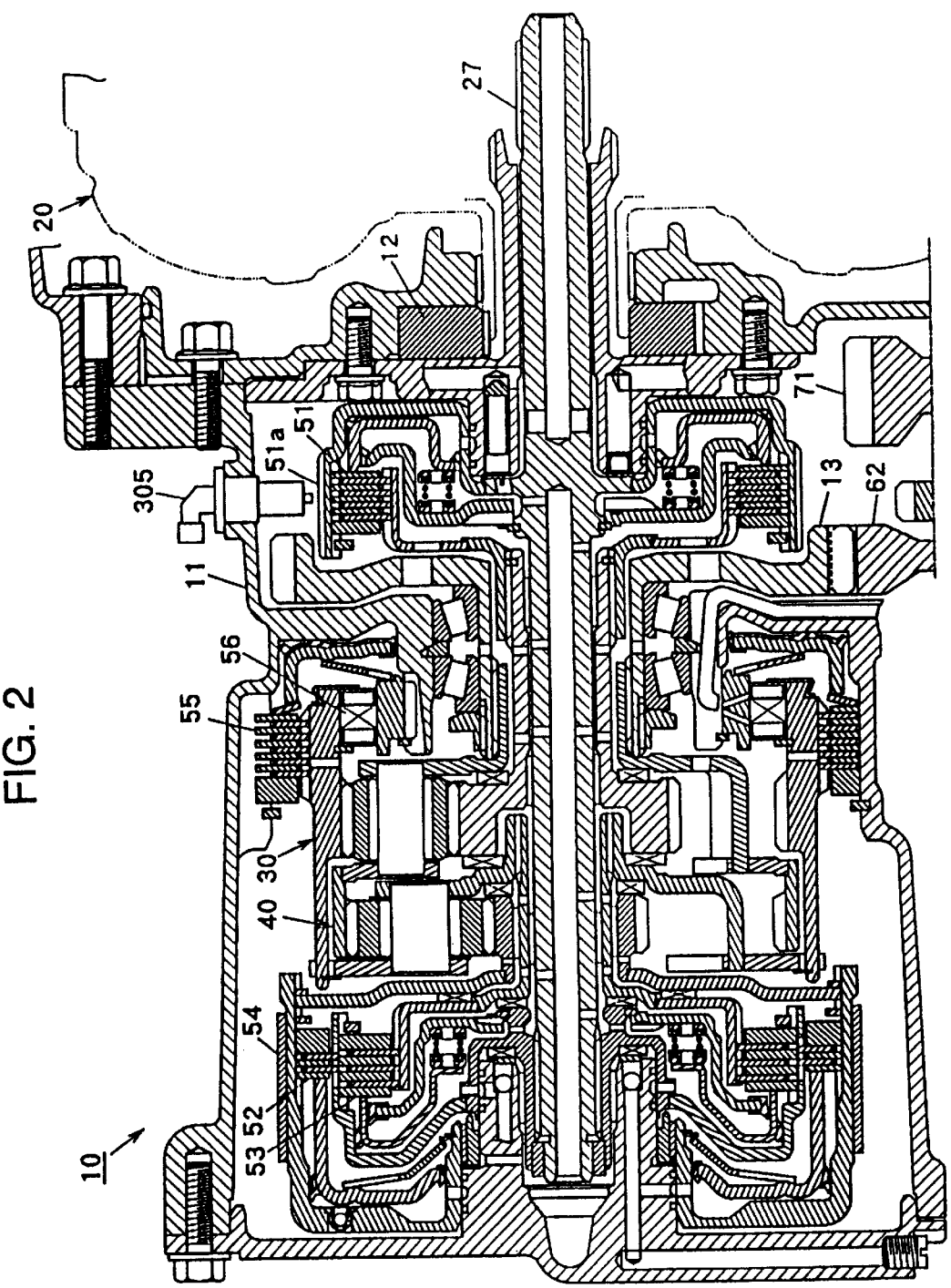
FIG. 2 is an enlarged cross-sectional view of a transmission gear mechanism.

Referring now to the drawings in detail, and in particular, to FIGS. 1 and 2, an automatic transmission 10 equipped with a control system in accordance with an embodiment of the present invention has, as its essential components, a torque converter 20 and a transmission gear mechanism which consists of a first planetary gear mechanism 30 and a second planetary gear mechanism 40 arranged coaxially with each other in a direction from the front to the back. In this instance, these first planetary gear mechanism 30 and second planetary gear mechanism 40 change a power transmission path by selectively coupling and uncoupling various friction coupling elements 51–55 such as clutches and brakes including a forward clutch (a first friction coupling element), a 2-4 brake (a second friction coupling element) and a 3-4 clutch (a third friction coupling element), and a one-way clutch (a fourth friction coupling element) 56 to place the automatic transmission into desired gears, namely first (1ST) to fourth (4TH) gears in a drive (D) range, the first (1st) to third (3RD) gears in a second speed (S) range, the first (1ST) and the second (2ND) gears in a low speed (L) range, and a reverse gear in a reverse (R) range.

Torque converter 20, which multiplies engine torque, has a pump 22 and a turbine 23, respectively, and a stator 25. The pump 22 is placed within and secured to a converter casing 21 secured to an engine output shaft 1. The turbine 23 is placed within the converter casing 21 facing the pump 22, and is driven by means of a special lightweight oil discharged from the pump 22. The stator 25 is inserted between the pump 22 and turbine 23 and mounted on a transmission casing 11 through a one-way clutch 24 and functions to multiply engine torque. The torque converter 20 thus structured performs transmission of turbine rotation to the first planetary gear mechanism 30 and second planetary gear mechanism 40 through a turbine shaft 27. The torque converter 20 is equipped with a lockup clutch 26 placed between the converter casing 21 and turbine 23 for mechanically coupling the pump 22, and hence the pump shaft 1 2, and the turbine 23 together when it is actuated. Behind the torque converter 20 there is provided an oil pump 12 driven by the engine output shaft 1 through the converter casing 21.

First planetary gear mechanism 30 is comprised of a sun gear 31, a plurality of pinion gears 32 in mesh with the sun gear 31, a pinion carrier 33 for carrying the pinion gears 32, and a ring gear 34 in mesh with the pinion gears 32. Similarly, the second planetary gear mechanism 40 is comprised of a sun gear 41, a plurality of cylindrical pinion gears 42 in mesh with the sun gear 41, a pinion carrier 43 for carrying the pinion gears 42, and a ring gear 44 in mesh with the pinion gears 32. The automatic transmission further includes a forward clutch (FWC) 51 disposed between the turbine shaft 27 and the sun gear 31 of the first planetary gear mechanism 30, a reverse clutch (RVC) 52 disposed between the turbine shaft 27 and the sun gear 41 of the second planetary gear mechanism 40, a 3-4 clutch (3-4C) 53 disposed between the turbine shaft 27 and the sun gear 41 of the second planetary gear mechanism 40, and a 2-4 brake (2-4B) 54 for locking the sun gear 41 of the second planetary gear mechanism 40. Further, a low-reverse brake (L-RB) 55 and a one-way clutch (OWC) 56 are disposed in parallel with each other between the transmission casing 11 and the ring gear 34 of the first planetary gear mechanism 30 and the pinion carrier 43 of the second planetary gear mechanism 40 which are connected to each other. An transmission output gear 13 is connected to the pinion carrier 33 of the first planetary gear mechanism 30 and the ring gear 44 of the second planetary gear mechanism 40. Intermediate transmission mechanism 60 includes an idle shaft 61 on which first and second intermediate gears 62 and 63 are mounted. The first intermediate gear 62 is in mesh with the transmission output gear 13, and the second intermediate gear 63 is in mesh with an input gear 71 of a transfer 70. The differential 70 to which rotation of the transmission output gear 13 is transmitted through a differential casing 72 drives right and left drive wheel axles 73 and 74.

Frictional coupling elements 51–45, such as brakes and clutches and the one-way clutch 56, are selectively actuated so as to place the automatic transmission 10 into available gears as indicated in Table I in FIG. 3. In the Table I, a friction coupling element indicated by a circle in parentheses is actuated only in the low speed (L) range.

Transmission gear mechanism of the automatic transmission 10 is shown in detail in FIG. 2. As seen in FIG. 2, the automatic transmission 10 is equipped with a turbine speed sensor 305 secured to the transmission casing 11.

The following description will be directed to a hydraulic control circuit for supplying or charging operating pressure to and releasing operating pressure from pressure chambers of the respective friction coupling elements 51–55.

Figure 4:
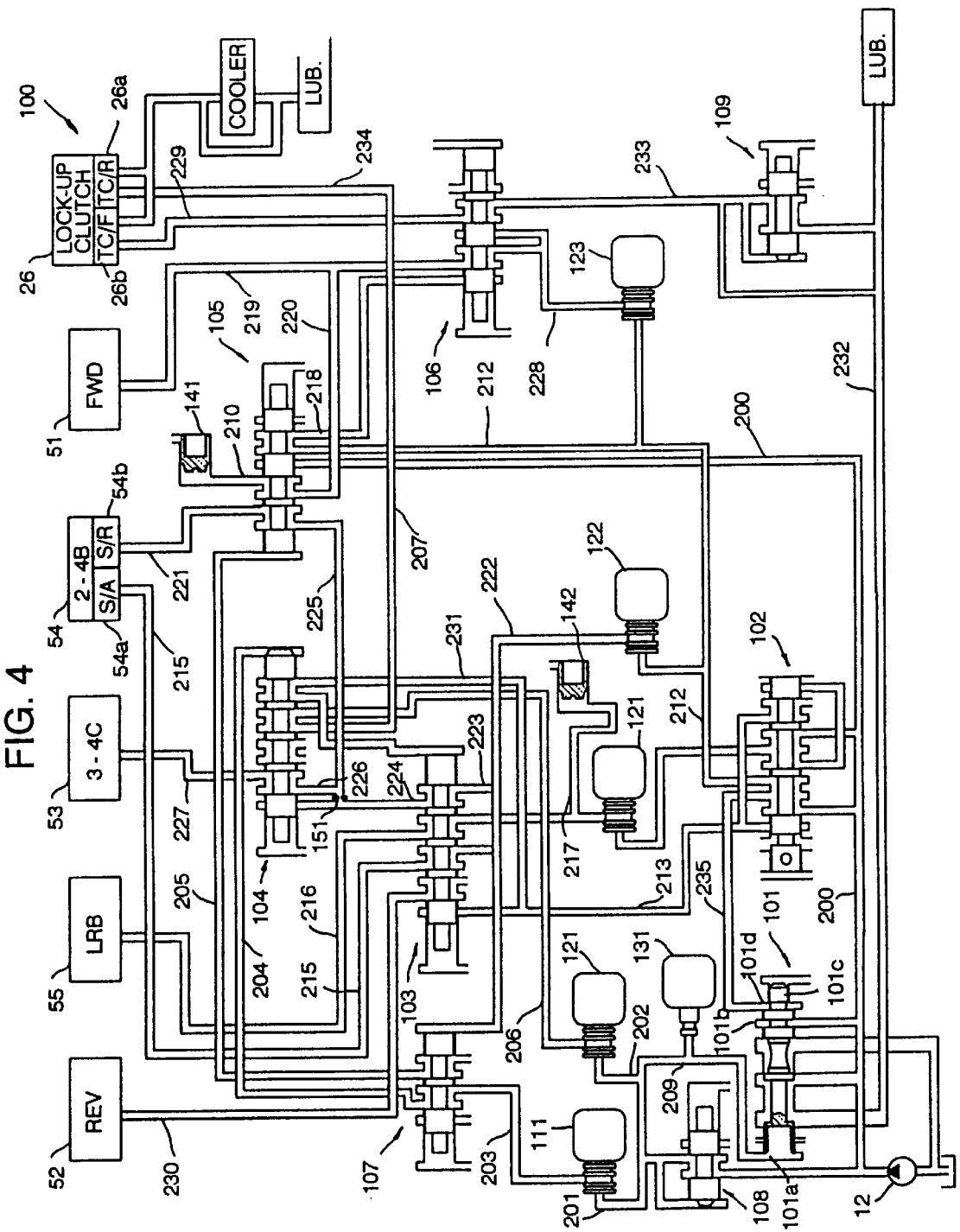
FIG. 4 is a hydraulic control circuit diagram of a transmission control system.

Referring to FIG. 4 showing the hydraulic control circuit, one of the friction coupling elements 51–55, namely the 2-4 brake (2-4B) 54 including a band brake, has a brake apply pressure chamber (S/A) 54a and a brake release pressure chamber (S/R) 54b. The 2-4 brake (2-4B) 54 is coupled or locked when the operating pressure is supplied only to the brake apply pressure chamber 54a and is uncoupled or released when the operating pressure is not supplied to the brake apply pressure chamber 54a nor to the brake release pressure chamber 54b, when the operating pressure is supplied to both pressure chambers 54a and 54b, or when the operating pressure is supplied only to the brake release pressure chamber 54a. Each of the remaining friction coupling elements has a single hydraulic pressure chamber and is locked only when operating pressure is supplied to the hydraulic pressure chambers.

As shown in FIG. 4, a hydraulic pressure control circuit 100 includes as its essential elements a regulator valve 101 for generating line pressure, a manual shift valve 102 for changing operating ranges of the automatic transmission 10 according to range selections by means of the shift lever, a low-reverse valve 103 for selectively opening and closing oil pressure paths leading to the friction coupling elements 51–55 according to gears selected, a bypass valve 104, a 3-4 shift valve 105 and a lockup control valve 106. The control circuit 100 further includes first and second ON-OFF solenoid valves 111 and 112 (which are hereafter referred to simply as first and second solenoid valves and labeled "SV" in the drawings for simplicity) for actuating these valves 103–106, a solenoid relay valve 107 (which is hereafter referred to simply as a relay valve and labeled "SRV" in the drawings) for changing destination friction coupling elements to which operating pressure is supplied from the first solenoid valve 111, and first to third duty solenoid valves 121–123 (which are labeled DSV in the drawings) for controlling operating pressure charge or discharge for the first to third duty solenoid valves 121–123. These solenoid valves 111 and 112 and duty solenoid valves 121–123 are of a three-way type which provides communication in passages upstream or downstream therefrom or drains oil from the downstream oil passage. Since the valves shut the upstream oil passages during draining oil from the downstream oil passage, there occurs no drainage of oil from the upstream oil passage with a result of decreasing driving loss of the oil pump 12. Specifically, each of the solenoid valves 111 and 112 opens its downstream oil passage when it is ON. Each of the duty solenoid valves 121–123 provides complete communication between the upstream and downstream oil passages when it operates at a duty ratio of 0% (which is a ratio of a time for which the valve keeps opened relative to a time of one ON-OFF period) but shuts down the upstream oil passage at a duty ratio of 100% so as to drain the oil from the downstream oil passage. At duty ratios between 0% and 100%, the duty solenoid valves 121–123 develops operating pressure on the downstream side on the basis of operating pressure on the upstream side as an initial pressure.

Regulator valve 101 regulates the pressure of operating oil discharged from the oil pump 12 to develop a predetermined level of line pressure which is delivered to the manual shift valve 102 through a main pressure line 200 and also to a solenoid reducing valve 108 (which is hereafter referred simply to as a reducing valve) and the 3-4 shift valve 105. The line pressure is reduced by the reducing valve 108 to a predetermined level and then, delivered to the first and second solenoid valves 111 and 112 through pressure lines 201 and 202, respectively.

When the first solenoid valve 111 assumes ON, the predetermined level of operating pressure is further delivered to a relay valve 107 through a pressure line 203. If the relay valve 207 has placed its spool in the right end position as viewed in the figure, the operating pressure at a predetermined level is supplied to the bypass valve 104 at its control port as pilot pressure through a pressure line 204, forcing the spool to the left end position. On the other hand, if the relay valve 107 has placed its spool in the left end position as viewed in the figure, the operating pressure at the predetermined level is supplied to the 3-4 shift valve 105 at its control port as pilot pressure through a pressure line 205, forcing the spool to the right end position. When the second solenoid valve 112 assumes ON, the operating pressure at a predetermined level regulated by the reducing valve 108 is delivered to the bypass valve 104 through a pressure line 206. At this time, if the bypass valve 104 has placed its spool in the right end position as viewed in the figure, the operating pressure at the predetermined level is supplied to the lockup control valve 106 at its control port as a pilot pressure through a pressure line 207, forcing the spool to the left end position. On the other hand, if the bypass valve 104 has placed its spool in the left end position as viewed in the figure, the operating pressure is supplied to the low-reverse shift valve 103 at its control port as a pilot pressure through a pressure line 208, forcing the spool to the left end position.

Further, the predetermined level of operating pressure from the reducing valve 108 is also delivered to the regulator valve 101 at its regulation port 101a through a pressure line 209. In the pressure line 209 there is a linear solenoid valve 131 which regulate the predetermined level of operating pressure according, for instance, to engine load or engine throttle opening. In this way, the line pressure is regulated by the regulator valve 101 according to engine throttle opening. In this instance, the 3-4 shift valve 105 brings the main pressure line 200 into communication with a first accumulator 141 through a pressure line 210 when having placed its spool to the right end position as viewed in the figure.

Line pressure delivered to the manual shift valve 102 through the main pressure line 200 is directed to first and second output pressure lines 211 and 212 in a forward speed range, such as the drive (D) range, the slow speed (S) range and the low speed (L) range, to the first and third output pressure lines 211 and 213 in the reverse (R) range, or to the third output pressure line 213 in the neutral (N) range. The first output pressure line 211 leads to the first duty solenoid valve 121 so as to charge the line pressure as control source pressure. The first duty solenoid valve 121 leads at its downstream to the low-reverse valve 103 through a pressure line 214 and further, if the low-reverse valve 103 has placed its spool in the right end position, to the brake apply pressure chamber 54a of the 2-4 brake (2-4B) 54 through a pressure line or brake apply pressure line 215. On the other hand, if the low-reverse valve 103 has placed its spool in the left end position, the first duty solenoid valve 121 leads to the low-reverse brake (LRB) 55 through a pressure line or brake pressure line 216. A pressure line 217 branches off from the pressure line 214 and leads to a second accumulator 142.

Second output pressure line 212 leads to the second duty solenoid valve 122 and the third duty solenoid valve 123 so as to deliver for them the line pressure as control source pressure. The second output pressure line 212 also leads to the 3-4 shift valve 105. The second output pressure line 212 is connected to the lockup control valve 106 through a pressure line 218 if the 3-4 shift valve 105 has placed its spool in the left end position or to the forward clutch (FWC) 51 through a pressure line or forward clutch pressure line 219 if the 3-4 shift valve 105 has placed its spool in the right end position. A pressure line 220 branching off from the forward clutch pressure line 219 leads to the 3-4 shift valve 105 and is connected to the first accumulator 141 through the pressure line 210 if the 3-4 shift valve 105 has placed its spool in the left end position or to the brake release pressure chamber 54b of the 2-4 brake (2-4B) 54 through a pressure line or brake release pressure line 221 if the 3-4 shift valve 105 has placed its spool in the right end position.

Second duty solenoid valve 122, which receives the control source pressure through the pressure line 212, is connected at its downstream end to the relay valve 107 through a pressure line 222 and delivers a pilot pressure to the relay valve 107 at a control port so as to force the spool toward the left end position. A pressure line 223 branching off from the pressure line 222 leads to the low-reverse valve 103 and further to a pressure line 224 if the low-reverse valve 103 has placed its spool in the right end position. A pressure line 225, which branches off from the pressure line 224 and is provided with an orifice 151 in close proximity to the pressure line 224, leads to the 3-4 shift valve 105. If the 3-4 shift valve 105 has placed its spool in the left end position, the line pressure 225 is connected to the 2-4 brake (2-4B) 54 through the brake release pressure line 221. A pressure line 226, which branches off from the pressure line 225 leads to the bypass valve 104. If the bypass valve 104 has placed its spool in the right end position, the line pressure 226 is connected to the 3-4 clutch (3-4C) 53 through a pressure line or 3-4 clutch pressure line 227. The pressure line 224 further leads directly to the bypass valve 104 so as to be connected to the pressure line 225 through the pressure line 226 if the bypass valve 104 has placed its spool in the left end position. That is, the pressure lines 224 and 225 are brought into communication with each other so as to bypass the orifice 151.

Third duty solenoid valve 123, to which the control source pressure is delivered through the second output pressure line 212, is connected at its downstream end to the lockup control valve 106 through a pressure line 228. If the lockup control valve 106 has placed its spool in the right end position, the third duty solenoid valve 123 is connected to the forward clutch pressure line 219. On the other hand, if the lockup control valve 106 has placed its spool in the left end position, the third duty solenoid valve 123 is connected to the lockup clutch (L/C) 26 through the forward clutch pressure line 219.

Third output pressure line 213 extending from the manual shift valve 102 leads to the low-reverse valve 103 so as to deliver the line pressure. If the low-reverse valve 103 places its spool in the left end position, the third output pressure line 213 is connected to the reverse clutch (RVC) 52 through a pressure line or reverse clutch pressure line 230. A pressure line 231 branching off from the third output pressure line 213 is connected to the bypass valve 104. This pressure line 231 delivers the line pressure as a pilot pressure to the low-reverse valve 103 through the pressure line 208 if the bypass valve 104 places its spool in the right end position so as to cause the low-reverse valve 103 to force its spool to the left end position.

In addition, the hydraulic control circuit 100 is provided with a converter relief valve 109 which regulates operating pressure delivered by the regulator valve 101 through a pressure line 232 to a predetermined level and further supplied the predetermined level of operating pressure to the lockup control valve 106 through the pressure line 233. If the lockup control valve 106 places its spool in the right end position, it directs the predetermined level of operating pressure to the front pressure chamber 26a of the lockup clutch 26 through a pressure line 229. On the other hand, if the lockup control valve 106 places its spool in the left end position, it directs the predetermined level of operating pressure to the rear pressure chamber 26b of the lockup clutch 26 through a pressure line 234. While the lockup clutch 26 is unlocks when it receives the predetermined level of operating pressure in the front pressure chamber 26a, it slips according to pressure supplied to the front pressure chamber 24a which is developed by the third duty solenoid valve 123 when the lockup control valve 106 places its spool in the left end position.

A pressure line 235 is brought into communication with the main pressure line 200 through the manual shift valve 102 in any one of the drive (D) range, the second speed (S) range, the low speed (L) range and the neutral (N) range and leads to the regulator valve 101 at its pressure reduction port 101b. The regulator valve 101 regulates the line pressure regulates at the pressure reduction port 101b such that the regulated line pressure is lower in each of the respective D, S, L and N ranges than in the reverse (R) range.

Figure 5:
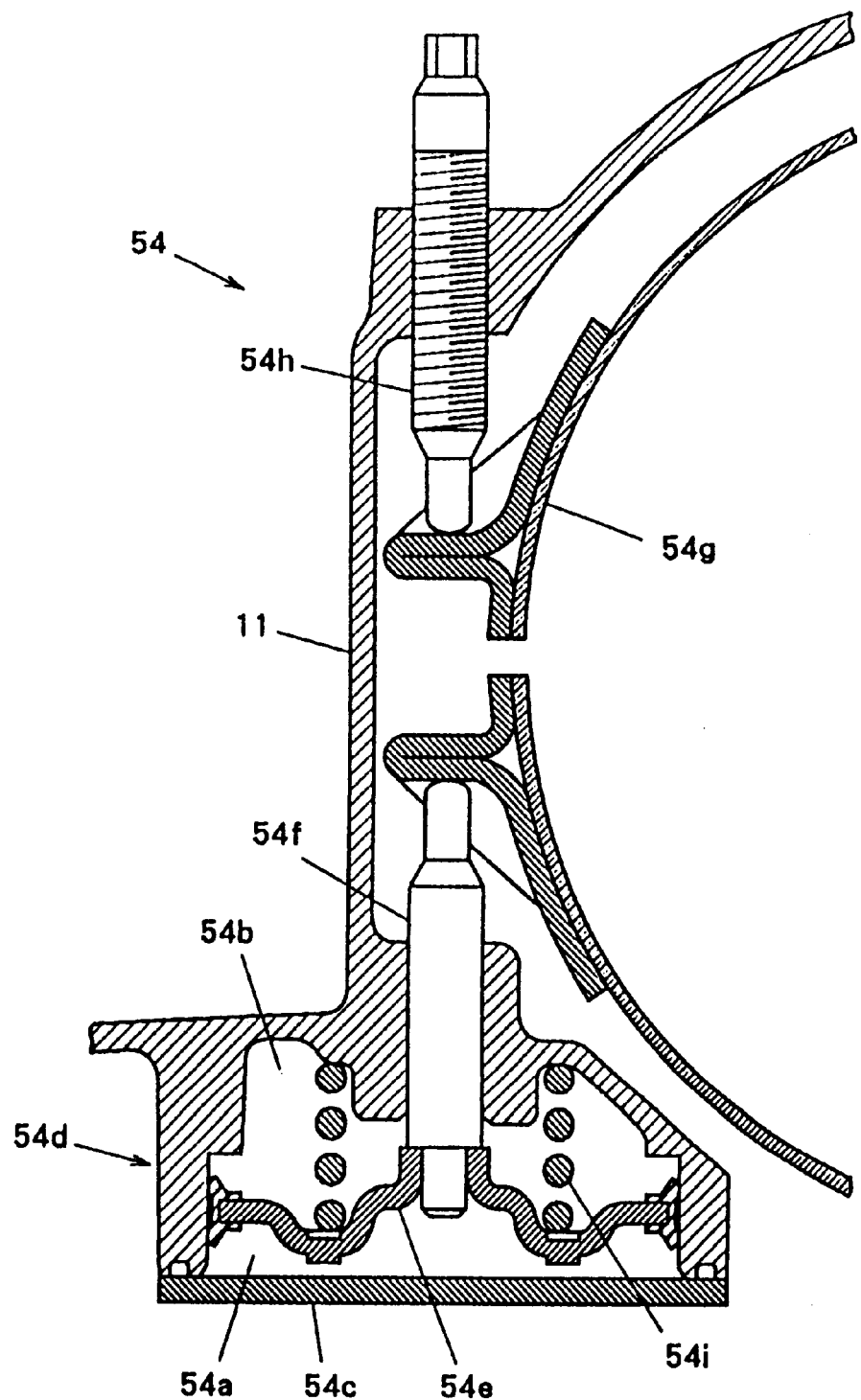
FIG. 5 is a cross-sectional view of a hydraulic actuator of a 2–4 brake.

Referring to FIG. 5 showing a hydraulic actuator of the 2-4 brake 54, the hydraulic actuator comprises a servo cylinder 54d formed by a transmission casing 11 and a cover 54c secured to the transmission casing 11 to provide a cylinder chamber therein. A piston 54e is disposed in the cylinder chamber to divide the cylinder chamber into two pressure chambers, namely the brake apply pressure chamber 54a and the brake release pressure chamber 54b and is provided with a piston rod 54f. The piston rod 54f at one end is in engagement with one end of a brake band 54g tied round a brake drum (not shown). An adjustable rod 54h is fixed to the transmission casing 11. The adjustable rod 54h at one end is in engagement with another end of the brake band 54g. A return spring 54i is disposed in the brake release pressure chamber 54b between the piston 54e and the transmission casing 11 to urge the piston 54e in a direction in which the piston rod 54f loosens the brake band 54g. Each of the brake apply pressure chamber 54a and the brake release pressure chamber 54b is supplied with hydraulic pressure through a control valve unit of the hydraulic control circuit 100 to fasten or loosen the brake band 54g so as to lock or unlock the 2-4 brake 54. Pressure areas are approximately equal to each other on opposite sides of the piston 54e, so that pressure at the same level in both brake apply pressure chamber 54a and the brake release pressure chamber 54b permits the piston 54e to be forced by only the return spring 54i in a direction in which the piston 54e relaxes the brake band 54g.

Figure 6:
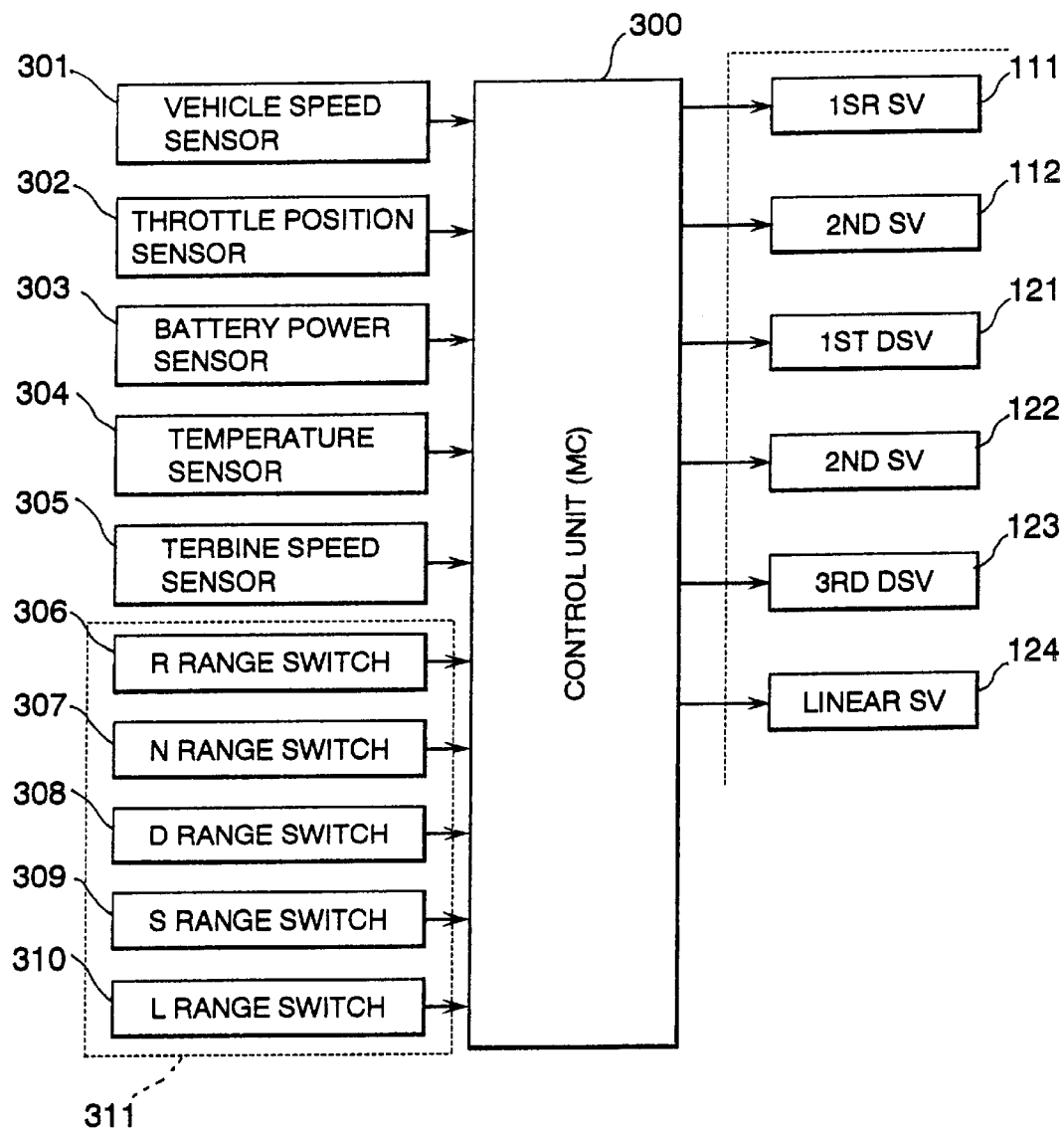
FIG. 6 is a block diagram showing a control system for various solenoid valves in the hydraulic control circuit of FIG. 4.

Hydraulic control circuit 100 cooperates with a controller 300 comprising a microcomputer (MC) shown in FIG. 6 which controls operation of the solenoid valves 111 and 112, the duty solenoid valves 121–123, and the linear solenoid valve 124. The controller 300 receives various control signals, such as a signal representative of a vehicle speed from a speed sensor 301, a signal representative of engine throttle opening as an engine load from a throttle position sensor 302, a signal representative of a power level of a battery from a batter power sensor 303, a signal representative of a hydraulic oil temperature from a temperature sensor 304 and a signal representative of a speed of rotation of turbine 23 of the torque converter 20 from a speed sensor 305. Further, the controller 300 receives inhibiter signals provided by an inhibiter switch arrangement 311 which comprises range select switches 306–310 detecting applied ranges. The solenoid valves 111, 112 and 121–123 are controlled according to driving conditions dictated by signals from these sensors 301–305 and switches 306–310.

Solenoid valves 111, 112 and 121–123 operate in various solenoid patterns in the respective gears as shown in FIG. 7. In the Table II in FIG. 7, it is noted that a circle in parentheses indicates a state, such as an ON or actuated state of each solenoid valve 111, 112, and an OFF or not-actuated state of each duty solenoid valve 121–123 in which pressure lines upstream and downstream from the related valve are brought into communication with each other to allow operating pressure to pass there through, and that a cross sign X in parentheses indicates a state, such as the OFF or not-actuated state of each solenoid valve 111–112 and the ON or actuated state of each duty solenoid valve 121–123, where the pressure line upstream from the related valve is shut off and the pressure line downstream from the related valve is drained.

Figure 8:
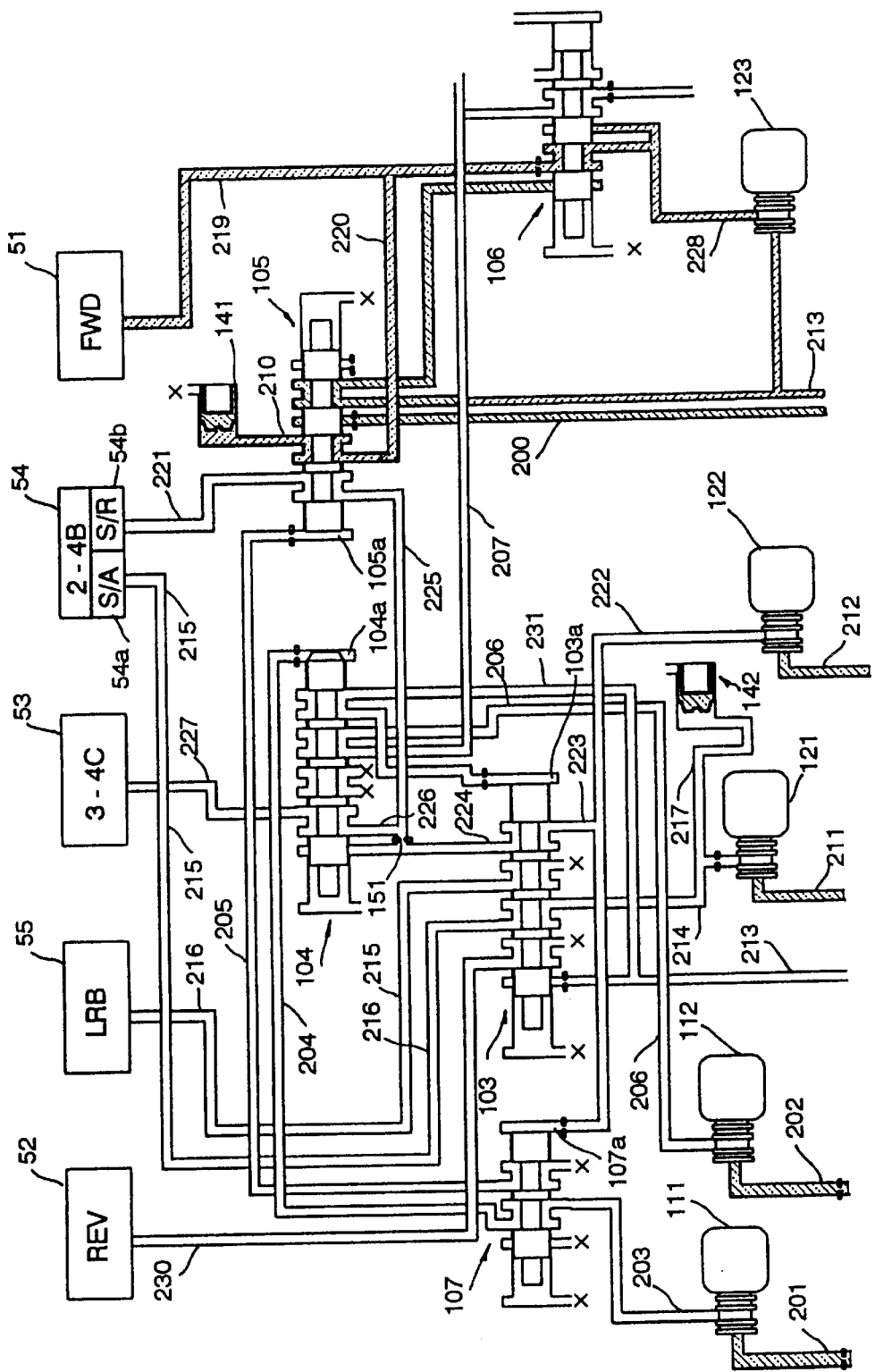
FIG. 8 is a hydraulic control circuit diagram placed in a first gear.

As shown in FIGS. 7 and 8, in the first (1st) gear in the forward range excepting the low-speed (L) range, only the third duty solenoid valve 123 is actuated or assumes ON state, making the line pressure in the second output pressure line 212 available as source pressure and directing it to the lockup control valve 106 through the pressure line 228. When the lockup control valve 106 has placed its spool in the right end position as viewed in the figure, it directs the operating pressure as coupling pressure to the forward clutch (FWC) 51 through the forward clutch pressure line 219 so as thereby to lock the forward clutch (FWC) 51. At this time, the first accumulator 141, in communication with the 3-4 shift valve 105 to which a pressure line 220 branching off from the pressure line 219 and the pressure line 210 leads, delivers the coupling pressure gradually to the forward clutch (FWC) 51.

Figure 9:
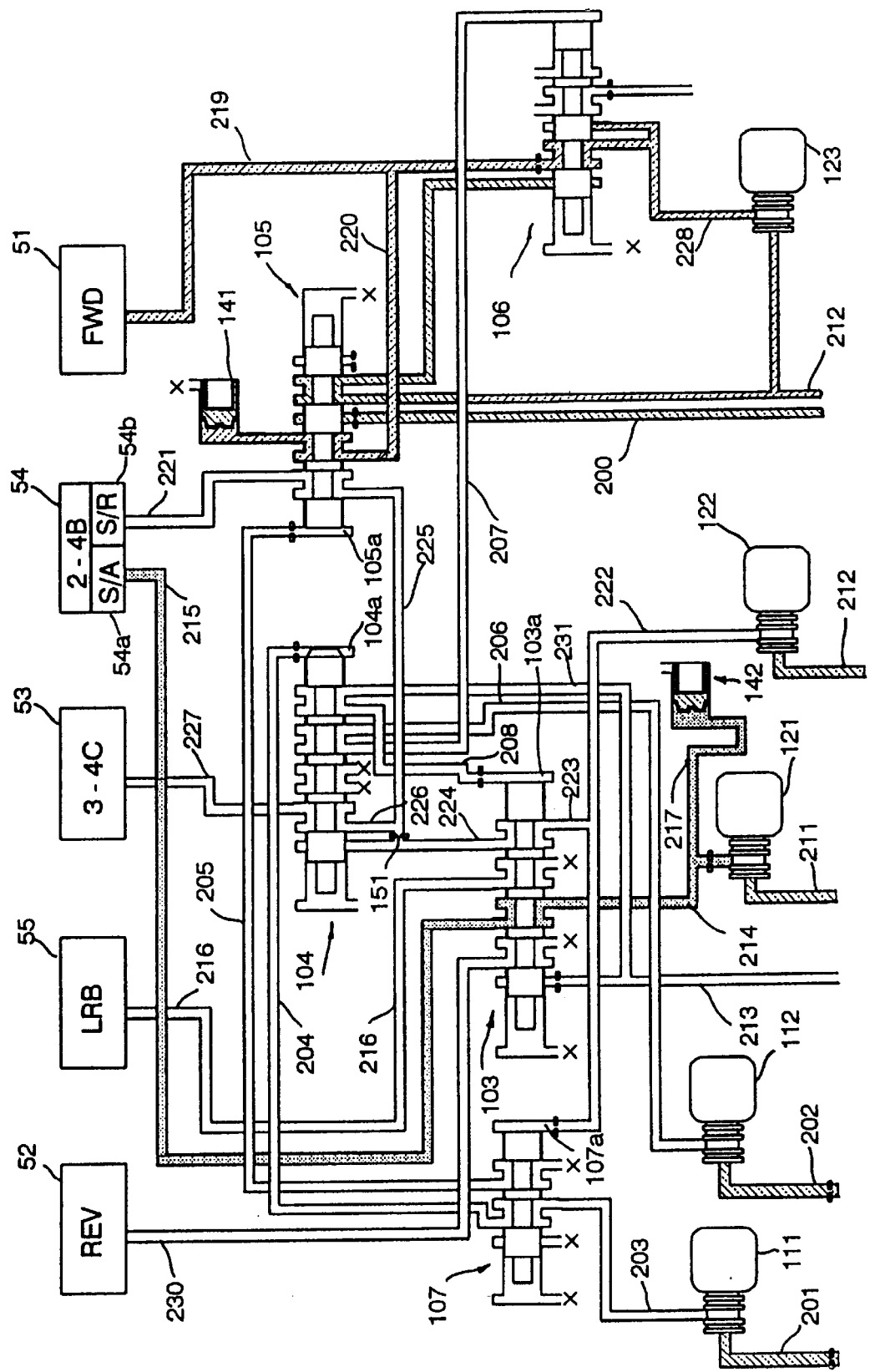
FIG. 9 is a hydraulic control circuit diagram placed in a second gear.

As shown in FIGS. 7 and 9, in the second (2ND) gear, the first duty solenoid valve 121, in addition to the third duty solenoid valve 123, is actuated or assumes ON state in the forward range excepting the low-speed (L) range, making the line pressure in the first output pressure line 211 available as source pressure and directing it to the low-reverse valve 103 through the pressure line 214. Since the row-reverse valve 103 has placed its spool in the right end position as viewed in the figure, it directs the operating pressure as a brake applying pressure to the brake apply pressure chamber 54a of the 2-4 brake (2-4B) 54 through the brake apply pressure line 215. As a result, the 2-4 brake (2-4B) 54, in addition to the forward clutch (FWC) 51, is locked. The second accumulator 142 causes locking the 2-4 brake (2-4B) 54 gently. Operating pressure accumulated temporarily in the second accumulator 142 is delivered to and pre-charged in the low-reverse brake (LRB) 55 when the low-reverse valve 102 shifts its spool to the left end position upon an output of a shift to the 1st (1st) gear in the low-speed (L) range as will be described later.

Figure 10:
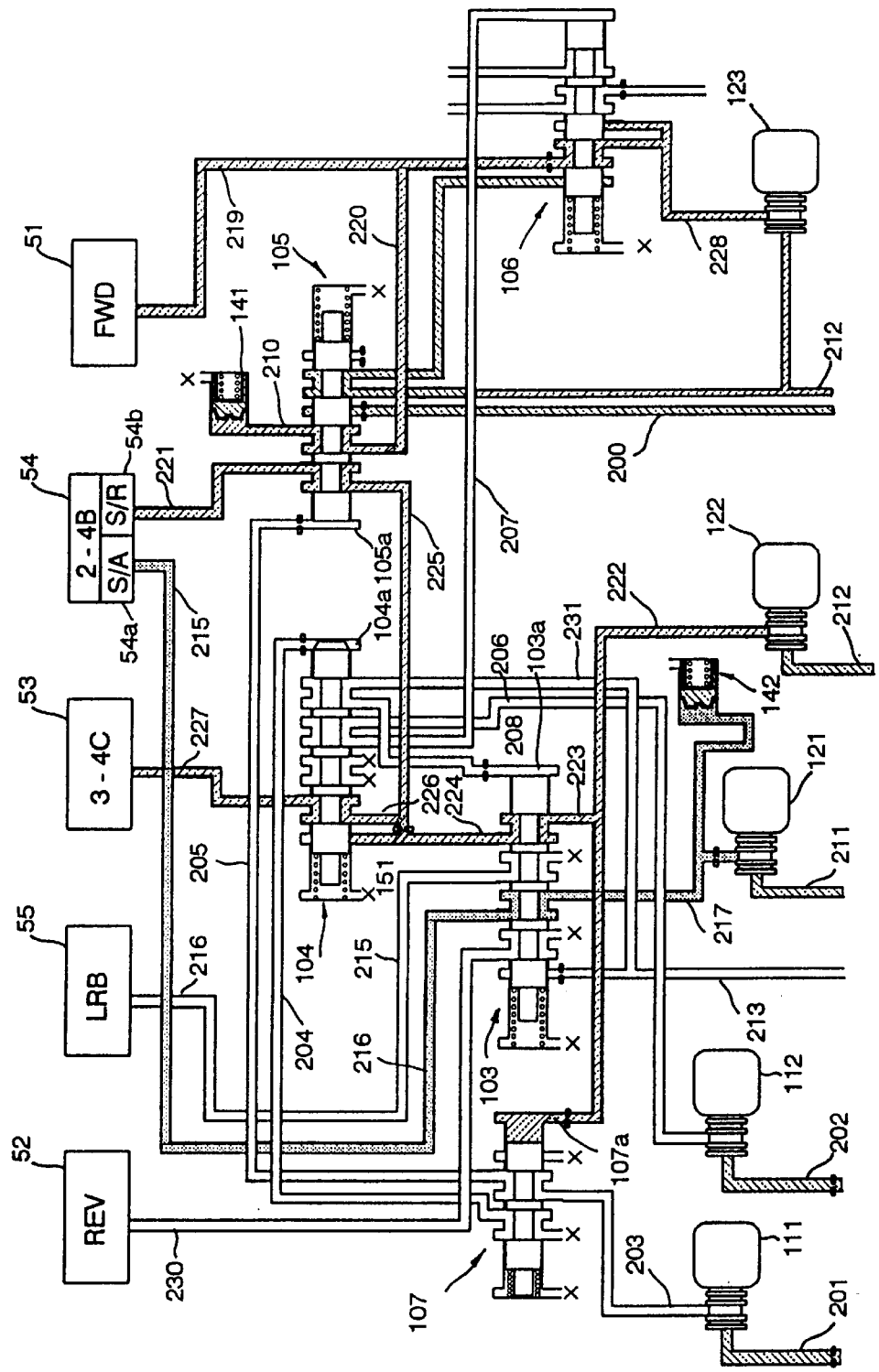
FIG. 10 is a hydraulic control circuit diagram placed in a third gear.

As shown in FIGS. 7 and 10, in the third (3RD) gear, the second duty solenoid valve 122, in addition to the first and third duty solenoid valves 121 and 123, is actuated or assumes ON state, making the line pressure in the second output pressure line 212 available as source pressure and directing it to the low-reverse valve 103 through the pressure line 222 via the pressure line 223. AT this time, the row-reverse valve 103 has placed its spool in the right end position as viewed in the figure, and it directs the operating pressure to the pressure line 224. On the other hand, the operating pressure from the second duty solenoid valve 122 is directed to the pressure line 225 through the pressure lines 222 and 224 via the orifice 151. Since, at this time, the 3-4 shift valve 105 has placed its spool in the left end position, the operating pressure is supplied as brake releasing pressure to the brake release pressure chamber 54b of the 2-4 brake (2-4B) 54 through the brake release pressure line 221, releasing or uncoupling the 2-4 brake (2-4B) 54. The pressure line 226, branching off from the pressure line 225 after the orifice 151, directs the operating pressure to the bypass valve 104 which allows the operating pressure to pass therethrough and reach the 3-4 clutch (3-4C) 53 through the 3-4 clutch pressure line 227. In such a way, selecting the third (3RD) gear causes, on one hand, the forward clutch (FWC) 51 and the 3-4 clutch (3-4C) 53 to be locked and, on the other hand, the 2-4 brake (2-4B) 54 to be unlocked. In the third (3RD) gear, the second duty solenoid valve 122 delivers the operating pressure to the relay valve 107 at the control port 107a, forcing the spool of the relay valve 107 to the left end position.

Figure 11:
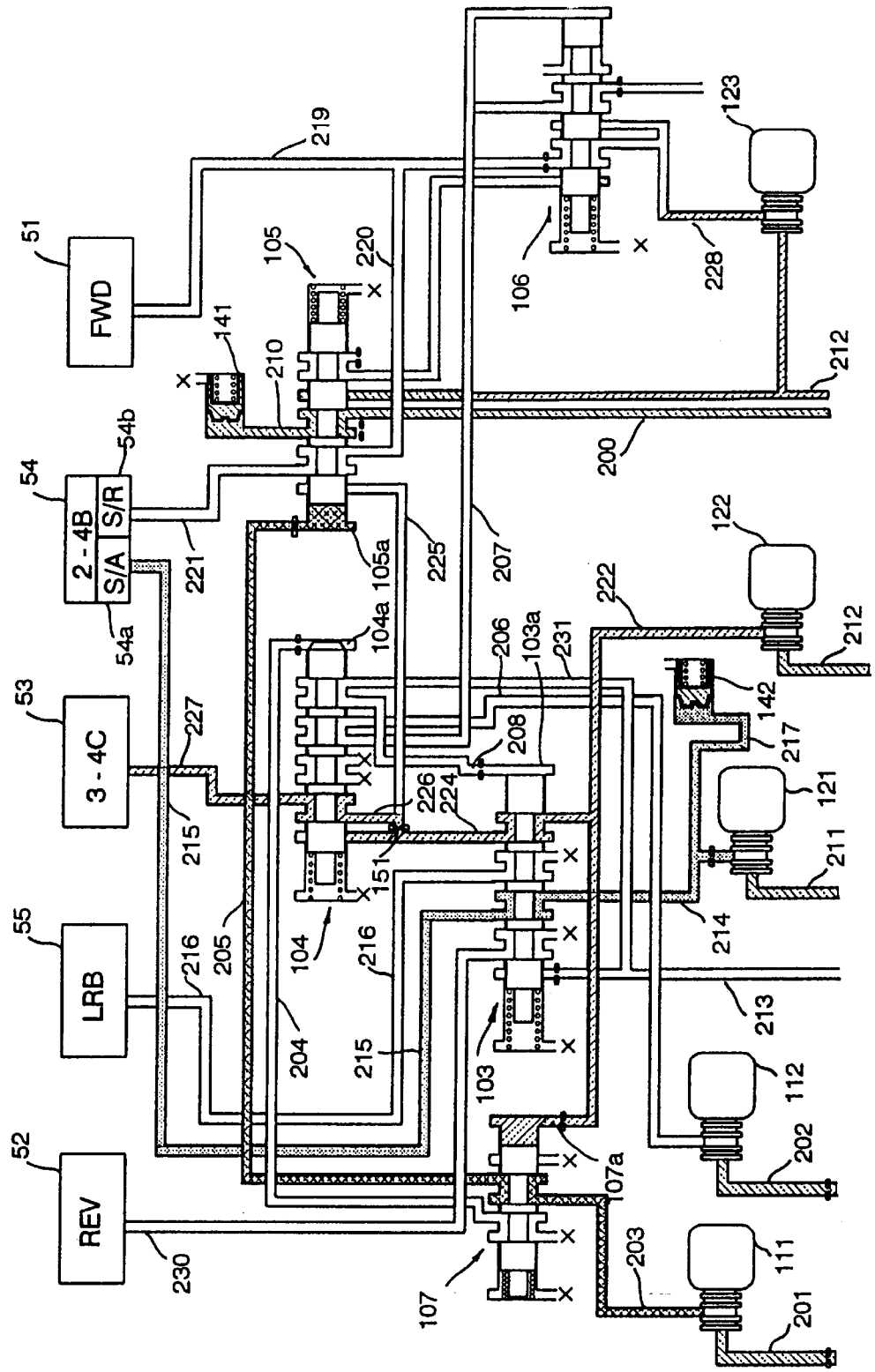
FIG. 11 is a hydraulic control circuit diagram placed in a fourth gear.

As shown in FIGS. 7 and 11, while the first and second duty solenoid valves 121 and 122 assume ON state, the third duty solenoid valve 123 is not actuated or assumes OFF state and the first solenoid valve 111 is actuated or assumes ON state. When the first solenoid valve 111 is actuated, the predetermined level of operating pressure in the pressure line 201 is directed to the relay valve 107 through the pressure line 203. Since the relay valve 107 has placed its spool in the left end position upon an output of a shift to the third (3RD) gear, the predetermined level of operating pressure passes therethrough and is directed to the control port 105a of the 3-4 shift valve 105 through the pressure line 205, so as thereby to force it to shift its spool to the right end position. Then, the 3-4 shift valve 105 brings the pressure line 220 branching off from the forward clutch pressure line 219 into communication with the brake release pressure line 221, providing communication between the forward clutch (FWC) 51 with the brake release pressure chamber 54b of the 2-4 brake (2-4B) 54. By means of not actuating the third duty solenoid valve 123 to shut down the operating pressure and drain the pressure line downstream therefrom, both forward clutch (FWC) 51 and 2-4 brake (2-4B) 54 are drained through the lockup control valve 106 and the pressure line 228. In the way, while the forward clutch (FWC) 54 is unlocked, the 2-4 brake (2-4B) 54 is locked again.

Figure 12:
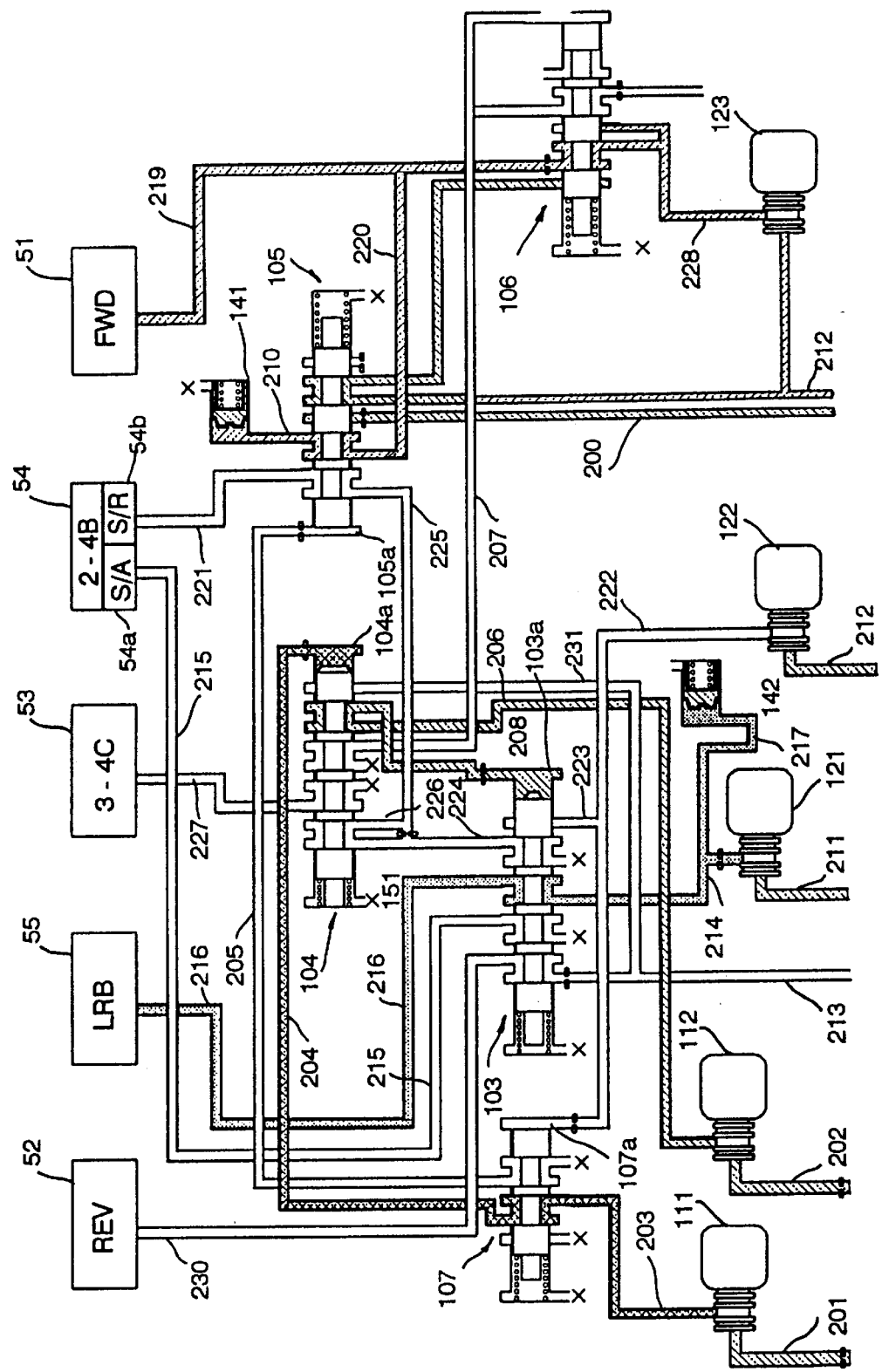
FIG. 12 is a hydraulic control circuit diagram placed in the first gear in a low speed (L) range.

As shown in FIGS. 7 and 12, when the first (1st) gear is selected in the low speed (L) range, the first and second solenoid valves 111 and 112 and the first and third duty solenoid valves 121 and 123 are actuated or assume ON states. The operating pressure regulated by the third duty solenoid valve 123 is directed as forward clutch locking pressure to the forward clutch (FWC) 51 through pressure lines 228 and 219 via the lockup control valve 106 in the same way as selecting the first (1st) gear in the drive (D) range, locking the forward clutch (FWC) 51. At this time, the operating pressure is introduced into the first accumulator 141 through the pressure lines 210 and 220 via the 3-4 shift valve 105, locking the forward clutch (FWC) 51 gently likely in the drive (D) range.

When the first solenoid valve 111 is actuated, the pilot pressure is delivered to the control port 104a of the bypass valve 104 through the pressure lines 203 and 204, forcing the bypass valve 104 to shift the spool to the left end position. The bypass valve 104 allows the operating pressure from the second solenoid valve 112 to pass therethrough and is directed to the low-reverse valve 103 through the pressure line 208, so as thereby to cause the low-reverse valve 103 to shift its spool to the left end position. Eventually, the operating pressure from the first duty solenoid valve 121 is delivered as low-reverse braking pressure to the low-reverse brake (LRB) 55 through the pressure line 216 via the low-reverse valve 103, locking the low-reverse brake (LRB) 55 as well as the forward clutch (FWC) 51. This creates the first (1st) gear with an effect of engine braking.

Figure 13:
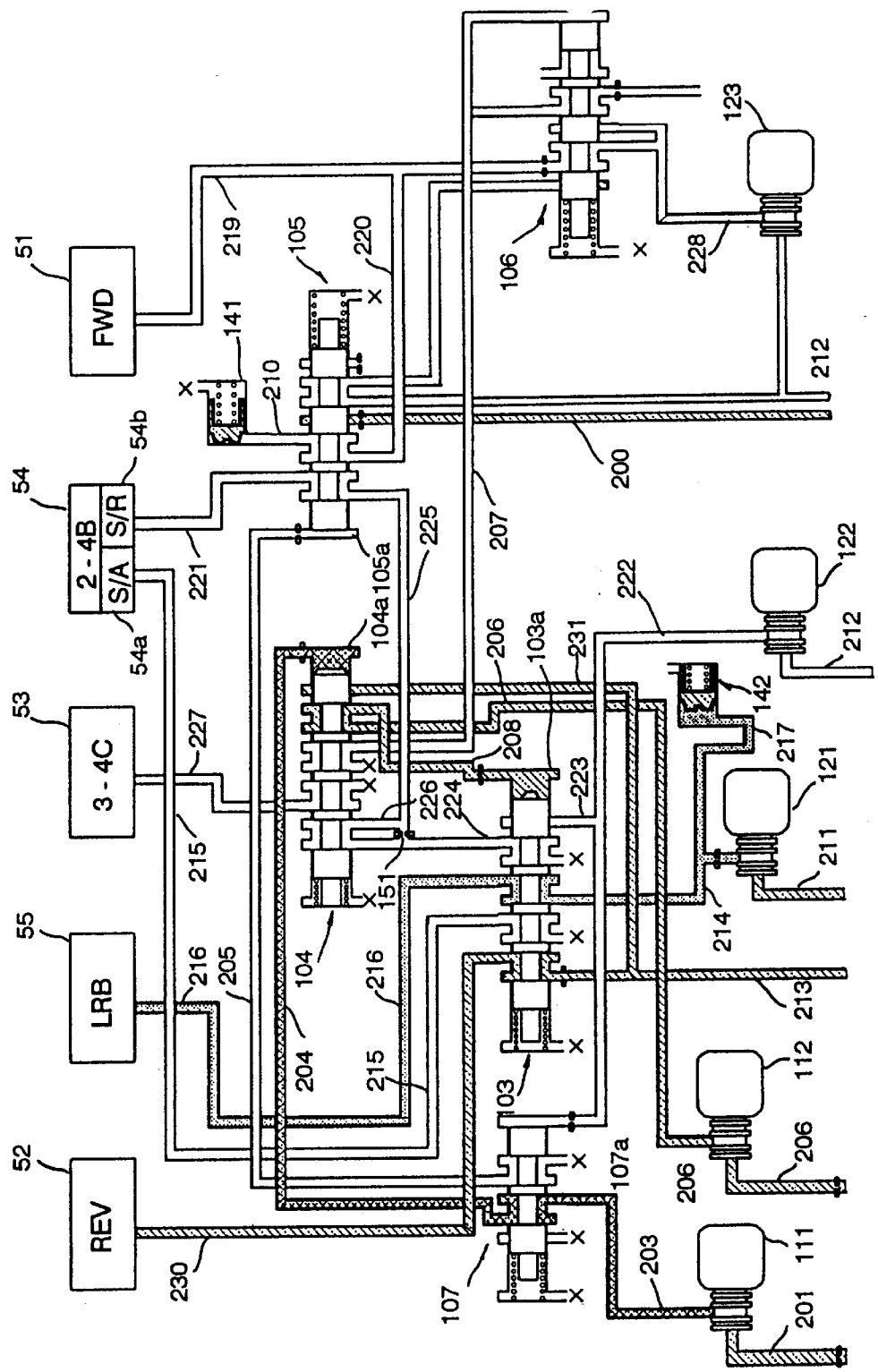
FIG. 13 is a hydraulic control circuit diagram placed in a reverse gear.

As shown in FIGS. 7 and 13, when the reverse gear is selected, while all of the solenoid valves 111 and 112 and 121–123 are actuated, there is however no line pressure from the second output pressure line 212 in the reverse (R) range, the second and third duty solenoid valves 122 and 123 do not develop any operating pressure. In the reverse (R) range, the first to third duty solenoid valves 121–123 are actuated and, as a result, causes the bypass valve 104 and the low-reverse valve 103 to shift their spools to their left end positions likely in the first gear in the low-speed (L) range. In such a state, the first duty solenoid valve 121 develops operating pressure and delivers it as braking pressure to the low-reverse brake (LRB) 55. Together, in the reverse (R) range, the manual shift valve 102 introduces the line pressure into the third output pressure line 213 and delivers it to the reverse clutch (RVC) 52 through the pressure line 230 via the low-reverse valve 103 with the spool placed in the left end position. In this way, the reverse clutch (RVC) 52 and the low-reverse brake (LRB) 55 are simultaneously locked. In this instance, since the line pressure is introduced into the third output pressure line 213 via the manual shift valve 102 even in the neutral (N) range, the reverse clutch (RVC) 52 is locked even in the neutral (N) range if the low-reverse valve 103 has placed its spool in the left end position.

The operation of the automatic transmission and the control system depicted in FIGS. 1 through 13 will be best understood by reviewing FIGS. 14 through 19, which are flow charts illustrating various general routine and subroutines for the microcomputer (MC) of the controller 300. Programming a computer is a skill well understood in the art. The following description is written to enable a programmer having ordinary skill in the art to prepare an appropriate program for the microcomputer (MC) of the controller 300. The particular details of any such program would of course depend upon the architecture of the particular computer selected.

Figure 14:
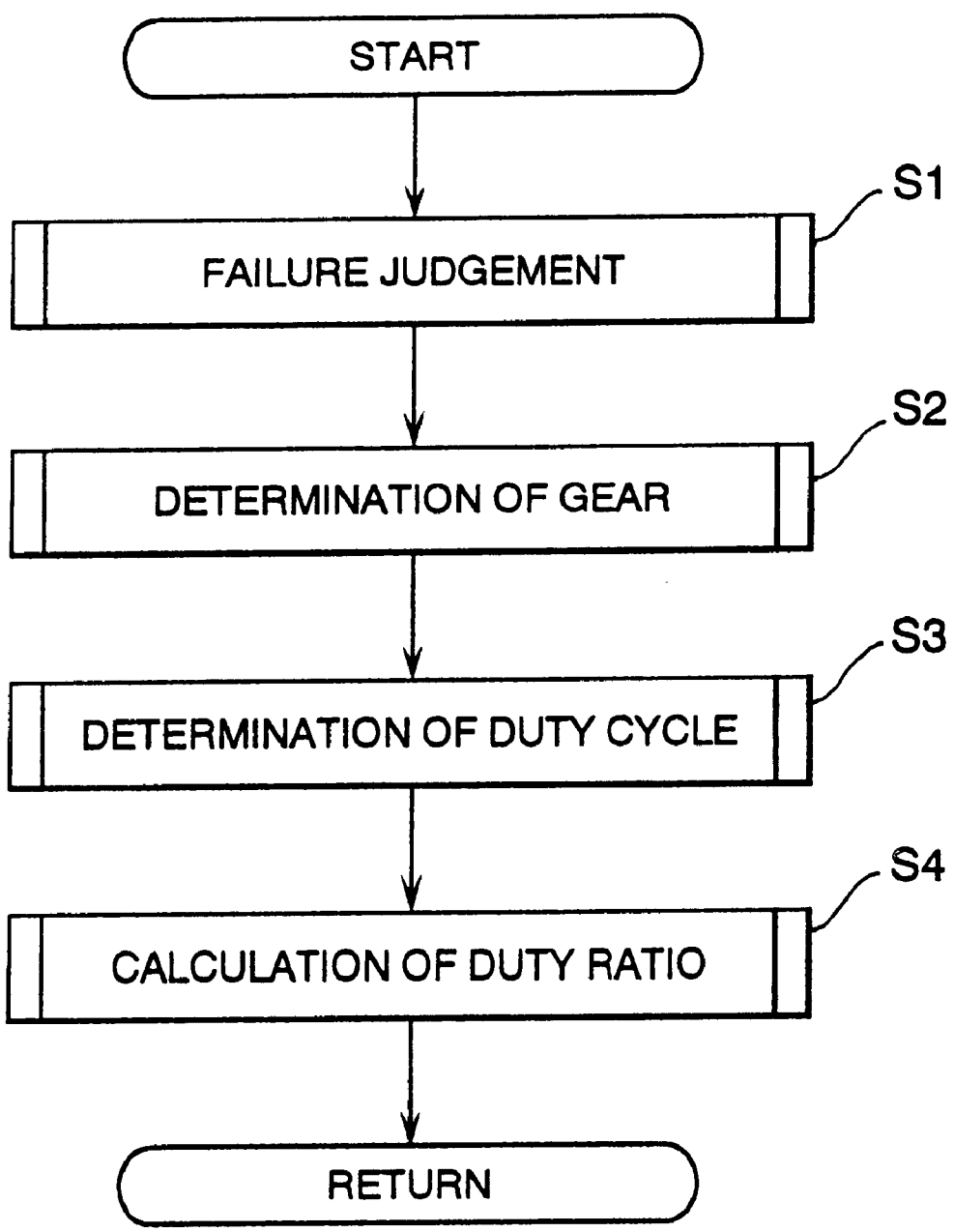
FIG. 14 is a flow chart illustrating a main routine of gear shift control.

Referring to FIG. 14, which is a flow chart of gear shift control main sequence routine, when the flow chart logic commences and control proceeds to a function block at step S1 where the controller 300 performs diagnosis of failures for the turbine speed sensor 305 and the inhibitor switch arrangement 311 based on incoming signals from the sensors 301–305 and the switches 306–310 of the inhibitor switch arrangement 311. After the diagnosis of failures, a target gear to which the automatic transmission is to shift is determined according to scheduled gear shift control patterns defined by maps with use of parameters including vehicle speed and engine throttle opening at step S2. Duty cycle with which the duty solenoid valve 121 to 123 are driven to bring the automatic transmission into the target gear are determined at step S3. Finally, duty ratios of the first to third duty solenoid valves 121 to 123 are calculated and drive signals representing the duty ratios are provided at step S4.

Figure 15:
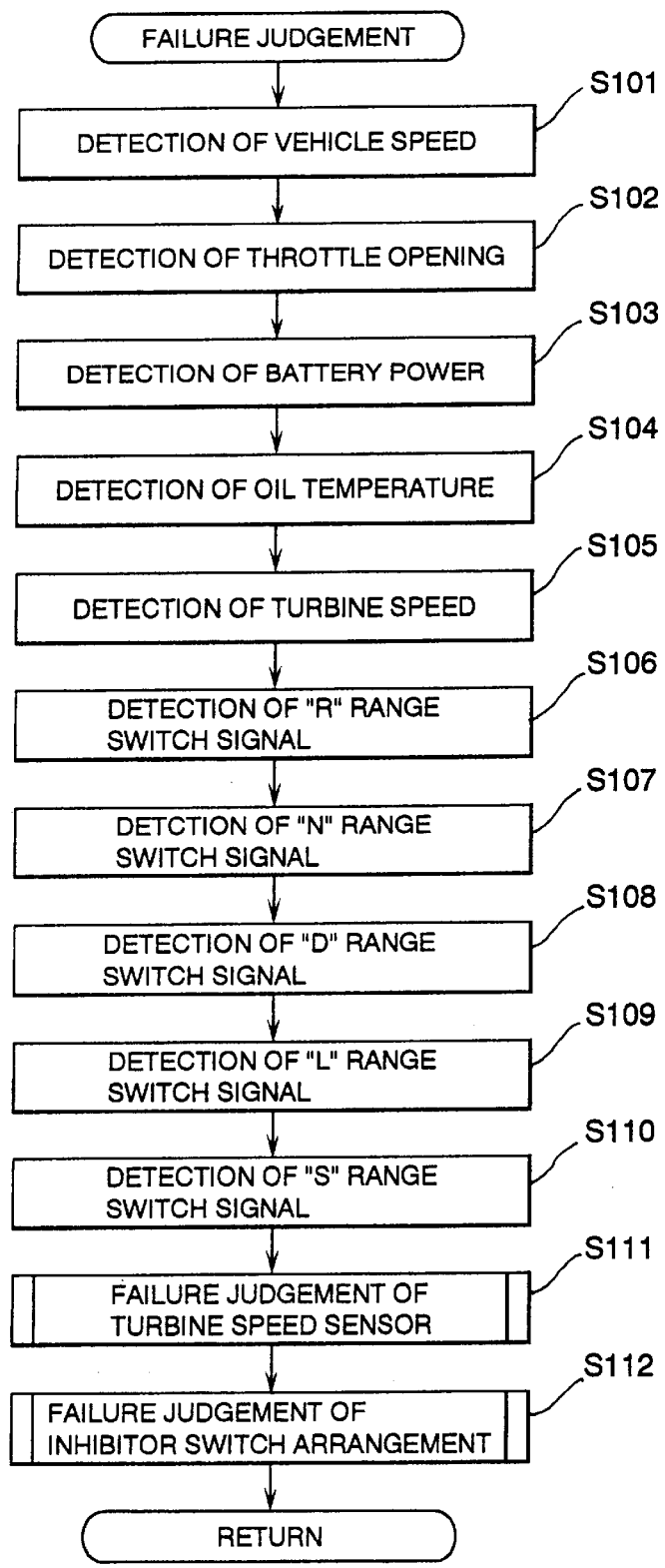
FIG. 15 is a flow chart illustrating a sequence subroutine of failure judgement.

Referring to FIG. 15, which is a flow chart illustrating a sequence subroutine of inhibitor switch arrangement failure detection, when the flow chart logic commences and control proceeds consecutively to functions at steps S101 through S110 to detect variables based on incoming signals from the sensors and switches 301 through 310. Specifically, a vehicle speed V is detected based on an incoming signal from the vehicle speed sensor 301 at step S101. An engine throttle opening is detected based on an incoming signal from the throttle position sensor 302 at step S102. A battery power level is detected based on an incoming signal from the power sensor 303 at step S103. A hydraulic oil temperature is detected based on an incoming signal from the temperature sensor 304 at step S104. A turbine speed Nt is detected based on an incoming signal from the speed sensor 305 at step S105. Subsequently, selected ranges are detected based on incoming signals from the range select switches 306 through 310 at steps S106 through S110, respectively. The diagnosis is made for the turbine speed sensor 305 based on the detected variables and select range signals at step S111 and for the inhibitor switch arrangement 311 based on the detected select range signals at step S112.

Figure 16:
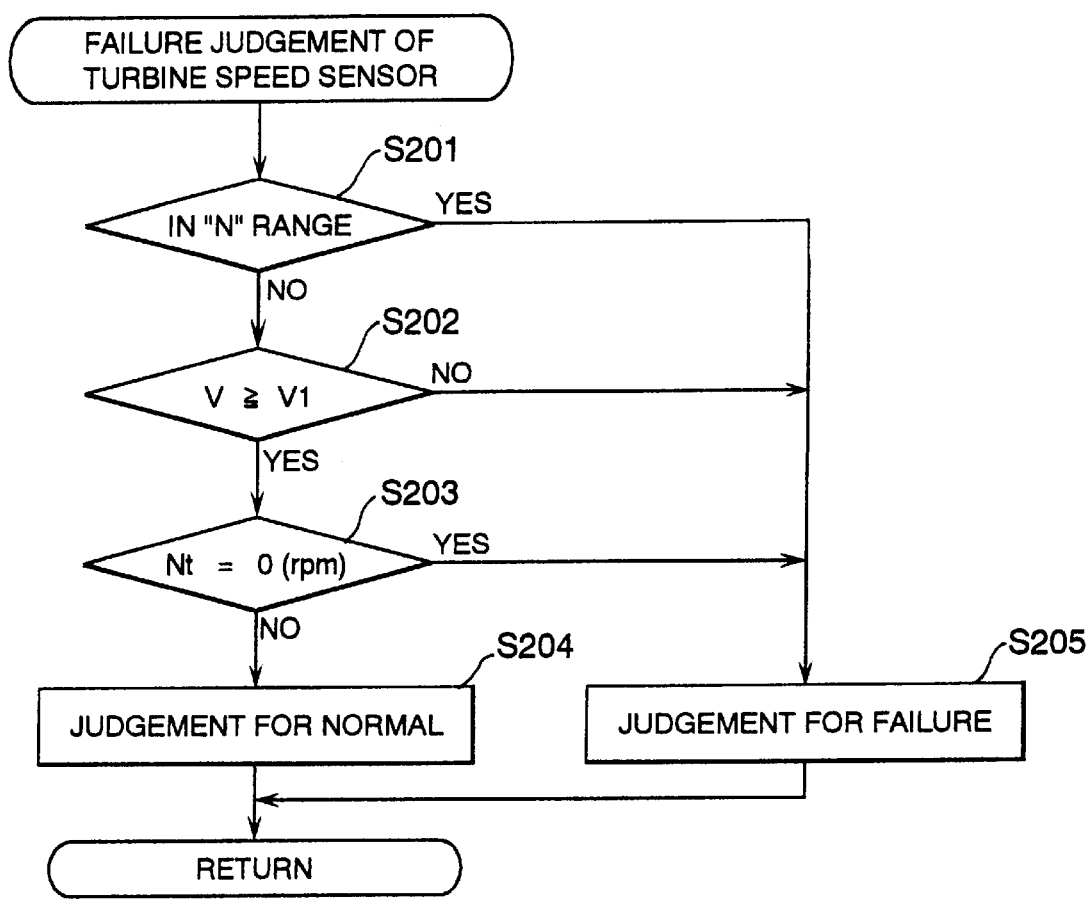
FIG. 16 is a flow chart illustrating a sequence subroutine of turbine speed sensor failure judgement.

Referring to FIG. 16, which is a flow chart of a sequence subroutine of diagnosis of turbine speed sensor failure determination, when the flow chart logic commences, a judgement is made at step S201 as to whether the neutral (N) range is selected. When a range other than the neutral (N) range is selected, the vehicle speed V is compared with a threshold speed V1, for example 40 km/h, to judge whether the vehicle speed V is equal to or higher than the threshold speed V1 at step S202. When the vehicle speed V is equal to or higher than the threshold speed V1, the turbine speed Nt is compared with a threshold speed Nt1, for example 0 rpm, to judge whether the turbine speed Nt is equal to the threshold speed Nt1 at step S203. When the turbine speed Nt is not 0 rpm, then it is decided that the turbine speed sensor 305 is operationally normal at step S204. On the other hand, when the turbine speed Nt is 0 rpm, then, it is decided that the turbine speed sensor 305 out of order at step S205. When it is decided at step S201 that the neutral (N) range is selected or when it is decided that the vehicle speed V is less than the threshold speed V1 at step S205, or after making a decision at step S204 and S205, the flow chart logic orders return to the main sequence routine, after the step in the main sequence routine calling for the turbine speed sensor diagnosis sequence subroutine.

Figure 17:
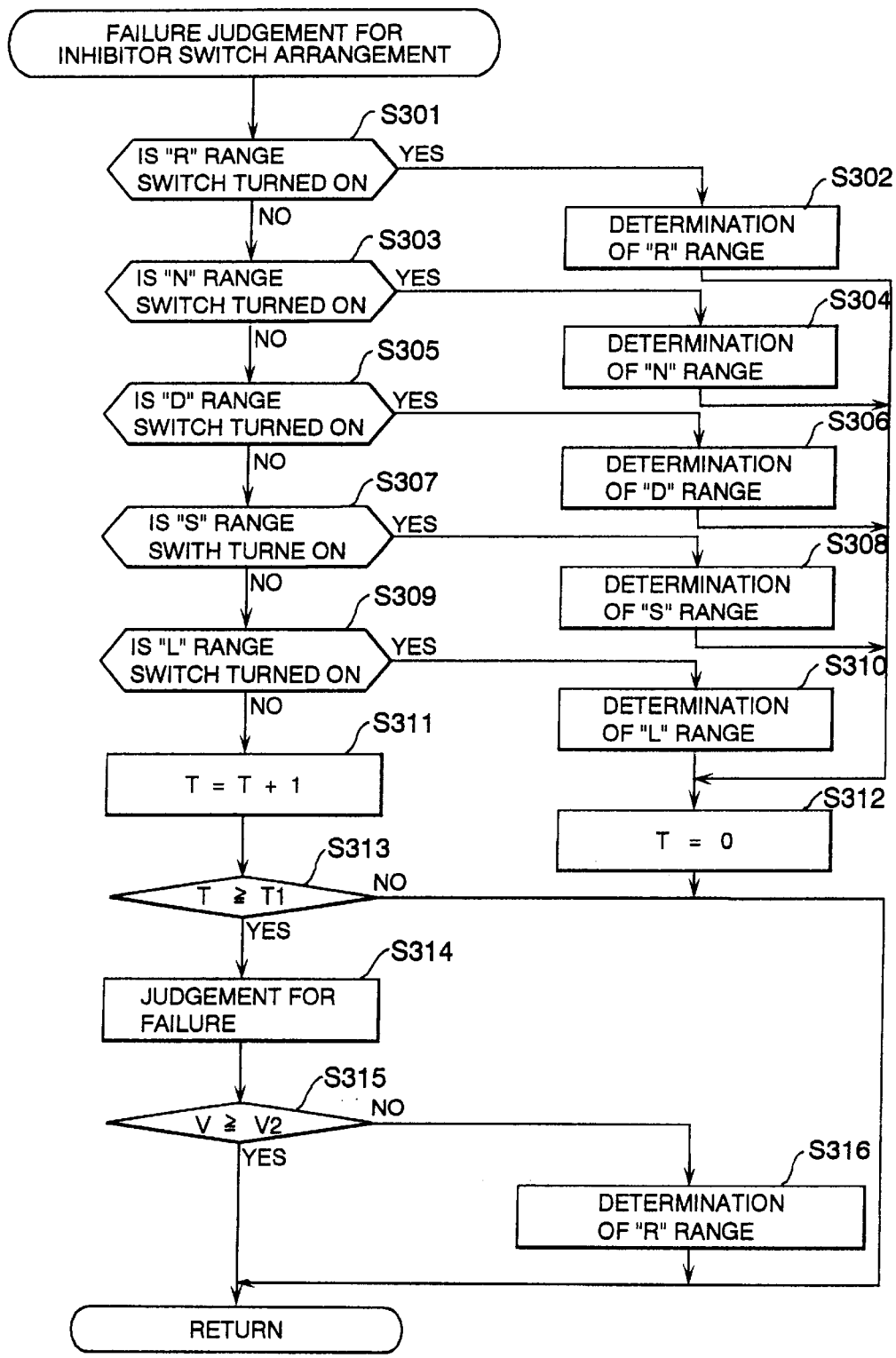
FIG. 17 is a flow chart illustrating a sequence subroutine of inhibitor switch arrangement failure judgement.

Referring to FIG. 17, which is a flow chart of a sequence subroutine of inhibitor switch arrangement failure determination, when the flow chart logic commences, judgements are made steps S301, S303, S305, S307 and S309 as to whether range select switches 306–310 remains turned ON, respectively. These judgements are made relating to the reverse (R) range, the neutral (N) range, the drive (D) range, the second speed (S) range and the low speed (L) range in this order. When a range select switch 306–310 remains turned ON, i.e. when there is a signal from the range select switch 306–310, it is decided that the range associated with the range select switch 306–310 is selected at step S302, S304, S306, S308 or S310. When a suspension time T1 elapses while there is no incoming signal from any range select switch 306–310, it is decided that the inhibitor switch arrangement 311 is out of order. The suspension time T1 is provided for the reason that any range select switch 306–310 remains open for a short time period during which a range is changed by the driver. Specifically, when there is no incoming signal from the range select switch 306–310 of the inhibitor switch arrangement 311, a timer count T is changed by an increment of 1 (one) at step S311. On the other hand, whenever a selected range decision is made, a timer is reset its count T to 0 (zero) at step S312. The timer count T is compared to a threshold time T1 at step S313. When the timer count T is equal to or greater than the threshold time T1, this indicates that a predetermined time T1 has elapsed with no signal provided from the range select switch 306–310, then, it is decided that the inhibitor switch arrangement 311 is out of order at step S314. Subsequently, the vehicle speed V is further compared with a threshold speed V2 greater than the threshold speed V1, for example 100 km/h, at step S315. When the vehicle speed V is further compared with a threshold speed V2, it is decided that the reverse (R) range is selected at step S316. When the threshold time T1 is not exceeded at step S313 or when the vehicle speed V is equal to or higher than the threshold speed V2 at step S415, or after resetting the timer count T to 0 (zero) at step S312 or after a decision of the reverse (R) range at step S316, the flow chart logic orders return to the sequence routine, after the step in the sequence routine calling for the inhibitor switch arrangement diagnosis sequence subroutine. In this instance, the reason why it is decided that the reverse (R) range is selected when the vehicle speed V is lower than the threshold speed V2 is that the first to third duty solenoid valves 121–123 take the same solenoid pattern in the reverse (R) range as in the third gear in the drive (R) range the flow chart logic orders return to the sequence routine directly when the vehicle speed V is equal to or greater than the threshold speed V2 even in the event where the inhibitor switch arrangement 311 is decided to be out of order. Accordingly, a range that is decided to be selected at step S302, S304, S306, S308 or S310 immediately before making the decision of failure of the inhibitor switch arrangement 311, so that the decision of selected range is held. In particular, because the threshold speed V2, which is 200 km/h, is high, the drive (D) range is held in most cases, and the decision of the reverse (R) range is made when the vehicle speed V drops lower than the threshold speed V2.

Figure 18:
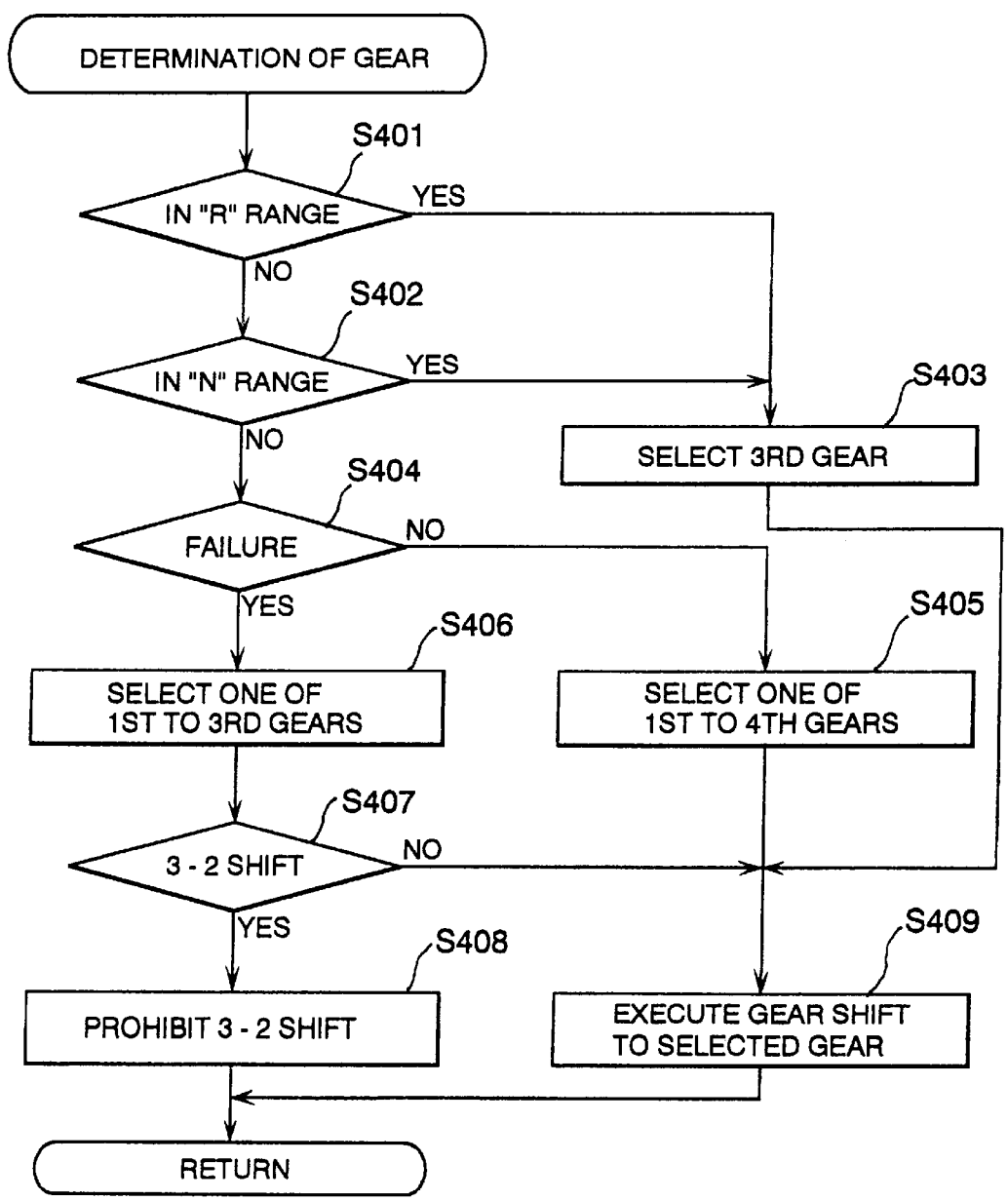
FIG. 18 is a flow chart illustrating a sequence subroutine of gear determination.

Referring to FIG. 18, which is a flow chart of a sequence subroutine of the target gear determination, when the flow chart logic commences, judgements are made at steps S401 and S402 as to whether the reverse range (R) or the neutral (N) range is selected, respectively. When the reverse range (R) or the neutral (N) range is selected, the third (3RD) gear is selected at step S403. This is because the solenoid pattern for the of the reverse (R) range in which the first to third solenoid valves 121–123 remain turned OFF is just the same as that for the third (3RD) gear in the drive (D) range as shown in Table II in FIG. 7 and for the neutral (N) range. Accordingly, the solenoid pattern which is the same as that for the third (3RD) gear in the drive (D) range is applied for the reverse (R) range when selected as a result of the decision that the vehicle speed V is lower than threshold speed V2 while the inhibitor switch arrangement 311 is decided to be out of order and as a matter of course when intentionally selected by the driver.

Figure 20:
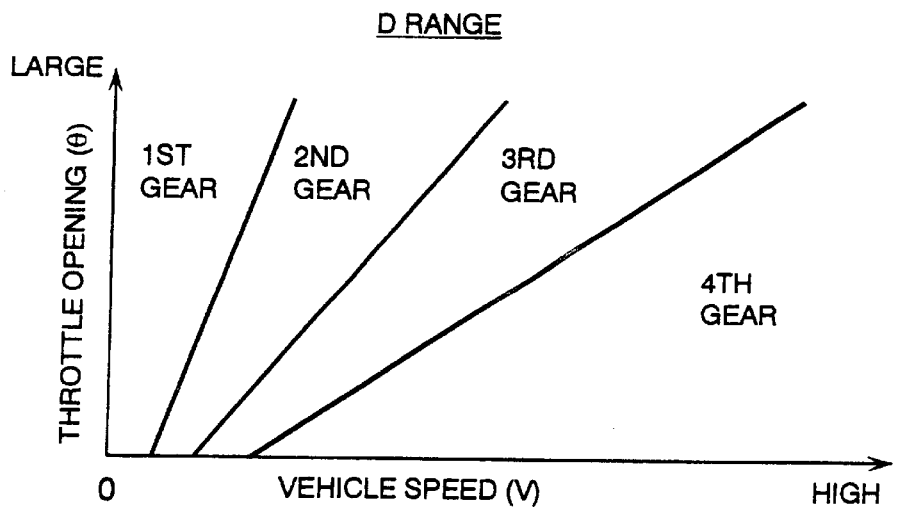
FIG. 20 is an illustration showing a scheduled gear shift control map for a low speed (L) range.
Figure 21:
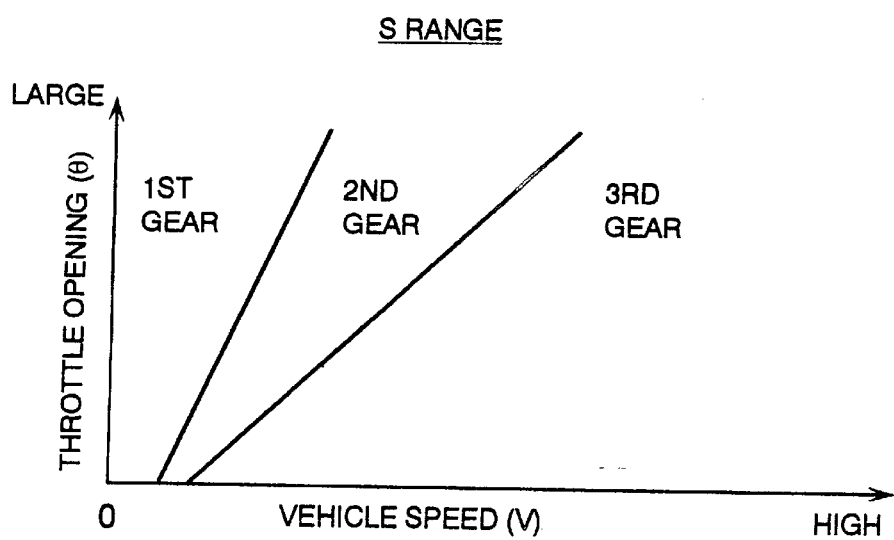
FIG. 21 is an illustration showing a scheduled gear shift control map for a drive (D) range.
Figure 22:
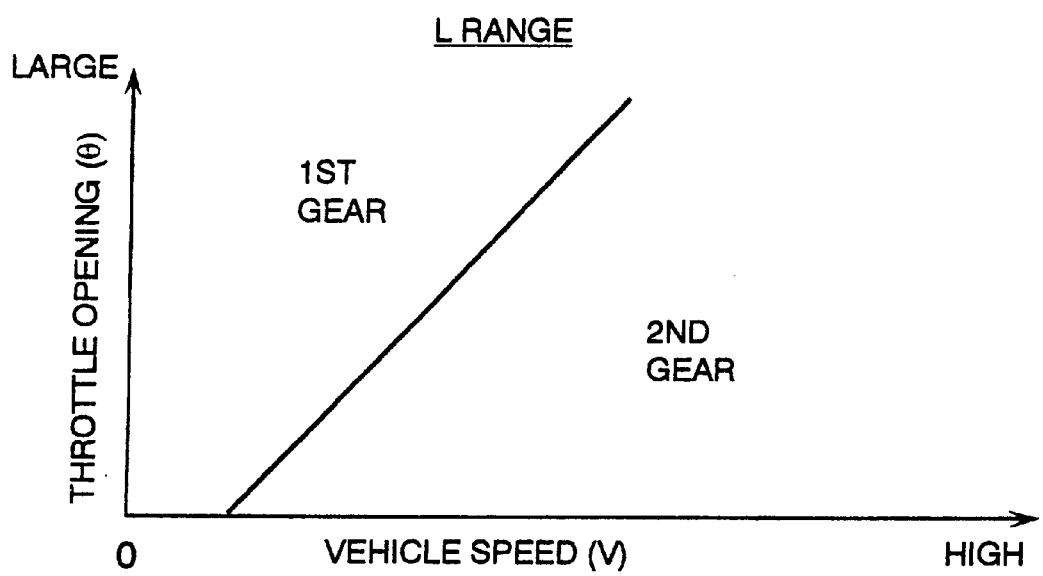
FIG. 22 is an illustration showing a scheduled gear shift control map for a second speed (S) range.

On the other hand, when any one of forward ranges, namely the drive (D), second speed (S) and low speed (L) ranges, is selected, a judgement is made at step S404 as to whether the turbine speed sensor 305 is judged to be out of order. When there is no failure of the turbine speed sensor 305, an ordinary target gear selection is made to determine a proper range and select one of the first to fourth gears in the range according to the vehicle speed V and the engine throttle opening θ at step S405. As is well known in the art, the microcomputer (MC) is programmed to perform predetermined scheduled gear shifts according to vehicle speeds V and engine throttle openings θ. The scheduled gear shift patterns are mapped for the respective forward ranges as shown in FIGS. 20 to 22. As shown, a higher gear is selected as the vehicle speed V increases and the engine throttle opening θ decreases. The controller 300 refers the gear shift control map for the determined range to determine the target gear according to the current vehicle speed V and engine throttle opening θ. In this instance, the gear selected for each specific vehicle speed V and engine throttle opening θ is lower in the second speed (S) range than in the drive (D) range and in the low speed (L) range than in the second speed (S) range. In each gear shift control map, there is no consistency between scheduled gear shift patterns for corresponding upshift and downshift and, although not shown in FIGS. 20 to 22, there is provided hysteresis between them for the purpose of preventing an occurrence of hunting. When there is any failure of the turbine speed sensor 305, a restricted target gear selection is made to determine a proper range and select one of the first to third gears in the range according to the vehicle speed V and the engine throttle opening θ at step S406. In the restricted target gear selection, it is prohibited to select the fourth gear in the drive (D) range. In this instance, in the gear shift control map for the drive (D) range shown in FIG. 20, selection of the fourth gear may be achieved by merging third and fourth gear areas together as a third gear area or shifting a gear shift line between second and third gear shift areas toward the higher vehicle speed side and lower engine throttle opening side. Otherwise, the gear shift control map for the second speed (S) range shown in FIG. 21 may be applied to the drive (D) range.

When the restricted target gear selection is made while there is a failure of the turbine speed sensor 305, a judgement is made at step S407 as to whether a third gear to second gear (3-2) downshift is selected, in other words, whether, when a present gear is third, the second gear is selected as a target gear. When the 3-2 downshift is selected, it is suspended to cause the 3-2 downshift at step S408. When the third gear is selected at step S403, when the ordinary gear selection is made at step S405, or when no 3-2 downshift is selected at step S408, a gear shift is executed to achieve the selected target gear at step S409. After the suspension of 3-2 downshift at step S408 or after the execution of a gear shift to the selected target gear at step S409, the flow chart logic orders return to the main sequence routine, after the step in the main sequence routine calling for the target gear determination sequence subroutine.

By means of the target gear determination control, the duty solenoid valves 121–123 achieve the solenoid pattern for the third gear even in the reverse (R) range and in the neutral (N) range. When a target gear is ordinarily determined in the drive (D) range, the second speed (S) range or the low speed (L) range while the turbine speed sensor 305 is normal, a gear shift is executed to achieve the target gear. When a target gear is restrictively determined in the drive (D) range, the second speed (S) range or the low speed (L) range while the turbine speed sensor 305 is out of order, a gear shift that is practically caused is any one of 1-2, 1-3 and 2-3 upshifts and 3-1 and 2-1 downshifts. Consequently, after the 3-2 downshift has been prohibited once at step S408, the 3-1 downshift is executed at step S409 to get out of the third gear when the first gear is selected as a target gear at step S406.

Figure 19:
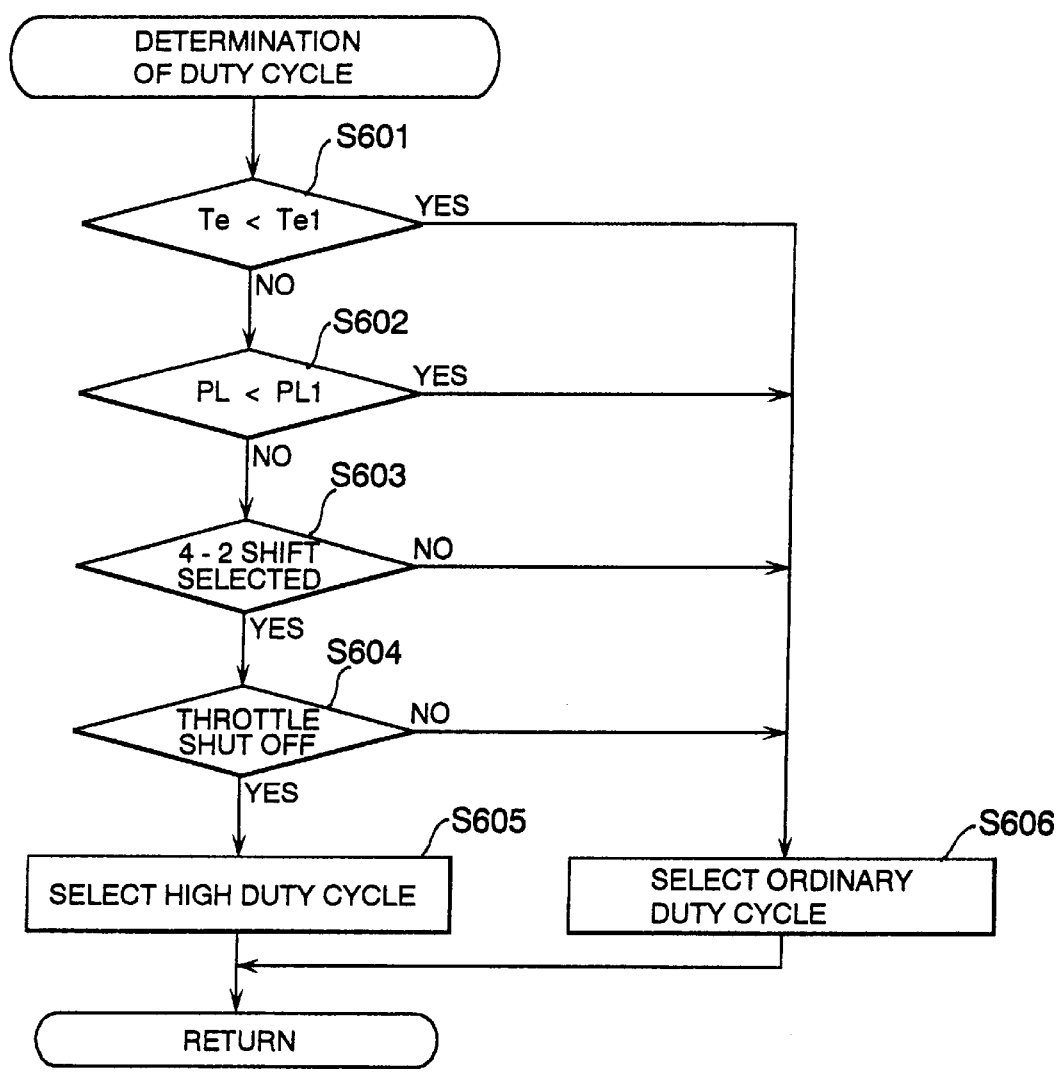
FIG. 19 is a flow chart illustrating a sequence subroutine of duty cycle determination.

Referring to FIG. 19, which is a flow chart of a sequence subroutine of the duty cycle determination sequence subroutine, when the flow chart logic commences, judgements are made at steps S601 and S602 as to whether the oil temperature Te is lower than a threshold temperature Te1 and whether the battery power level PL is lower than a threshold power level TL1, respectively. When the oil temperature Te and the battery power level PL are higher than threshold temperature Te1 and the threshold power level TL1, respectively, a judgement is made at step S603 as to whether a 4-2 jump downshift is selected. When a 4-2 jump downshift is selected while the oil temperature Te and the battery power level PL are higher than threshold temperature Te1 and the threshold power level TL1, a judgement is made at step S604 as to whether the engine throttle is shut off. When the engine throttle is shut off, then, this indicates the vehicle is in a power-off or reverse driving state in which inertial driving force of the drive wheel axles 73 and 74 is transmitted to the engine through the transmission 10, a high duty cycle of, for example, 84 Hz is selected for a duty solenoid valve, i.e. the third duty solenoid valve 123 in this instance, which is to be driven to lock the forward clutch 51, which is in an unlocked state in the fourth gear, during the 4-2 jump downshift at step S605. In any case where the oil temperature Te is lower than threshold temperature Te1, where the battery power level PL is lower than the threshold power level TL1, where the 4-2 downshift is not selected, or where the engine throttle remains open, i.e. where the vehicle is in a power-on or normal driving state in which engine output power is transmitted to the drive wheel axles 73 and 74 through the transmission 10, a low or ordinary duty cycle of, for example, 50 Hz is selected for one of the first to third duty solenoid valves 121–123 which is to be driven to provide a target gear determined in the ordinary gear selection at step S606.

By means of the duty cycle determination, the third duty solenoid valve 123 is driven with an ordinary duty cycle even during the 4-2 jump downshift when the vehicle is in the power-on state, when the oil temperature is lower than a specified level, or when the battery power is lower than a specified level.

As described above, in the case where the friction coupling elements such as the clutches and brakes 51–55 and the one-way clutch are selectively locked and unlocked to cause desired gear shifts, a target gear of each gear shift is determined according to scheduled gear shift control maps provided for each range, such as the drive (D) range, the second speed (S) range and the low speed (L) range shown in FIGS. 20–22, respectively. A particular gear is achieved by locking or unlocking only one friction coupling element. In some cases where gears are achieved by alternately locking and unlocking two specific friction coupling elements, in order to prevent the two friction coupling elements from interlocking or remaining released with an adverse effect of an abrupt rise in engine speed, it is essential to lock and unlock timely the two friction coupling element. For this reason, it is typical for an upshift which is accompanied by a drop in turbine speed so as to create an inertia phase by gradually locking one of the two friction coupling element prior to unlocking the other to cause a drop in turbine speed and to complete the lock of the one friction coupling element simultaneously with unlocking the other at a moment that the turbine speed reaches a specified speed.

On the other hand, for a downshift which is accompanied by a rise in turbine speed, it is typical in the power-on state in which the accelerator pedal is stepped on to create an inertia phase by gradually unlocking one of the two friction coupling element prior to locking the other so as to cause a rise in turbine speed and to complete the unlock of the one friction coupling element simultaneously with locking the other at a moment that the turbine speed reaches a specified speed. However, in the power-off state in which the accelerator pedal remains released, because the turbine speed must be risen by inertial driving force of the driving wheels, an inertia phase is created not by gradually unlocking one of the two friction coupling element beforehand but by gradually locking the other beforehand to cause a rise in turbine speed, and then, at a moment that the specified speed is attained, the one friction coupling element is unlocked. Accordingly, the turbine speed sensor 305 is essential to work always precisely in order to timely alternate lock and unlock between the two friction coupling element. In the event where the turbine speed sensor 305 fails to detect a turbine speed, a point of time at which the friction coupling element is succeedingly locked or unlocked is undecided, which leads to interlocking the two friction coupling elements or an abrupt rise in engine speed which is accompanied by shift shock.

Referring to FIG. 23, combinations of tow friction coupling elements which are alternately locked and unlocked to cause various gear shifts are summarized in Table III. In Table III, FWC, 3-4C, 2-4B and OWC indicate the forward clutch 51, the 3-4 clutch 53, the 2-4 brake 54 and the one-way clutch 56, respectively, and the mark "P" indicates that timely alternating lock and unlock between two friction coupling elements can be caused without using a turbine speed and the mark "IP" indicates that timely alternating lock and unlock between two friction coupling elements can be caused only by use of a turbine speed.

As was described previously, the first gear is provided by locking the forward clutch 51 and actuating the one-way clutch 56 to fix the ring gear 34 of the first planetary gear mechanism 30 and the pinion carrier 43 of the second planetary gear mechanism 40 to the transmission casing 11, and the second gear is provided by locking both forward clutch 51 and 2-4 brake 54 but releasing the one-way clutch 56. It is necessary for a 1-2 upshift to lock the 2-4 brake together with releasing the one-way clutch 56. In this instance, the one-way clutch 56 is spontaneously released as a result of rotation of the ring gear 34 of the first planetary gear mechanism 30 and the pinion carrier 43 of the second planetary gear mechanism 40 in a specific direction which is caused by controlling locking pressure through the first duty solenoid valve 121 so as to gradually lock the 2-4 brake 54. Consequently, as indicated in Table III, it is possible to timely alternating lock and unlock between the 2-4 brake 54 and the one-way clutch 56 without using a turbine speed detected by the turbine speed sensor 305 and, consequently, there is no necessity to prohibit the 1-2 upshift even if the turbine speed sensor 305 is out of order.

Similarly, for a 1-3 upshift which is achieved by alternately locking the 3-4 clutch 53 and unlocking the one-way clutch 56, alternating lock and unlock between the 3-4 clutch 53 and the one-way clutch 56 can be timely caused by controlling locking pressure through the second duty solenoid valve 122 so as to gradually lock the 3-4 clutch 53 and, consequently, there is no necessity to prohibit the 1-3 upshift even if the turbine speed sensor 305 is out of order. However, for a 1-4 jump upshift, both 2-4 brake 54 and 3-4 clutch are gradually locked beforehand by controlling locking pressure through the first and second duty solenoid valves 121 and 122, respectively, to provide a specified turbine speed and the forward clutch 51 is unlocked by actuating the third duty solenoid valve 123 to remove locking pressure from the forward clutch 51 at a moment that the specified turbine speed is attained. It is hard to detect the moment of removing locking pressure from the forward clutch 51 if the turbine speed sensor 305 is out of order and, consequently, it is preferred to prohibit the 1-4 jump upshift. In this instance, because the first solenoid valve 111 is actuated during progress of the 1-4 jump upshift, so that the 3-4 shift valve 105 is actuated to bring the brake release pressure line 221 into communication with the forward clutch pressure line 219 from communication with the 3-4 clutch pressure line 227. At a point of time that the actuation of the first solenoid valve 111 occurs, the second duty solenoid valve 122 is actuated to drain the brake release pressure from the 2-4 brake 54 as well as forward clutch locking pressure from the forward clutch 51, so as to begin locking the 2-4 brake 54.

Considering a downshift from the fourth gear in, in particular, the power-on state, unlocking one or tow friction coupling elements is caused prior to locking another friction coupling element. That is, the 2-4 brake 54, the 3-4 clutch 53, or both 2-4 brake 54 and 3-4 clutch 53 are begun to be locked beforehand for a 4-3 downshift, a 4-2 downshift or a 4-1 downshift, respectively. At a moment that a specified turbine speed is attained, the third duty solenoid valve 123 is timely actuated to supply locking pressure to the forward clutch 51. Consequently, it is hard to begin timely locking pressure supply to the forward clutch 51 if the turbine speed sensor 305 is out of order and it is preferred to prohibit downshifts from the fourth gear. For the same reason, it is preferred to prohibit upshifts to the fourth gear, such as a 1-4 upshift, 2-4 upshift and 3-4 upshift if the turbine speed sensor 305 is out of order. A 2-3 upshift is achieved by alternately locking the 3-4 clutch 53 and unlocking the 2-4 brake 54. In this instance, because the brake release pressure line 221 is in communication with the 3-4 clutch pressure line 227 through the 3-4 shift valve 105, as a result of which the 3-4 clutch 53 and the 2-4 brake 54 are simultaneously supplied with locking pressure and brake release pressure, respectively, with the result of timely locking and unlocking the 3-4 clutch 53 and the 2-4 brake 54, respectively. Consequently, the 2-3 upshift is permitted even if the turbine speed sensor 305 is out of order. On the other hand, because, for a 2-4 upshift, alternating lock and unlock between the 3-4 clutch 53 and the forward clutch 51 can be timely caused only by use of a turbine speed and because a downshift from the fourth gear is under the necessity of timely alternating lock and unlock between two friction coupling elements only by use of a turbine speed, it is preferred to prohibit the 2-4 upshift if the turbine speed sensor 305 is out of order. A 3-4 upshift is achieved by alternating lock and unlock between the 2-4 brake 54 and the forward clutch 51. As a result that the first solenoid valve 111 is actuated during progress of the 3-4 upshift, the 3-4 shift valve 105 is actuated to bring the brake release pressure line 221 into communication with the forward clutch pressure line 219 from communication with the 3-4 clutch pressure line 227. At a point of time that the actuation of the first solenoid valve 111 occurs, the third duty solenoid valve 123 is deenerzized to drain the brake release pressure from the 2-4 brake 54 as well as forward clutch locking pressure from the forward clutch 51, so as to timely lock the 2-4 brake 54 and unlock the forward clutch 51. While it is not always necessary to prohibit the 3-4 upshift even if the turbine speed sensor 305 is out of order, nevertheless, because, during a downshift from the fourth gear, it is impossible to cause timely alternate lock and unlock between two friction coupling elements without using a turbine speed if the turbine speed sensor 305 is out of order, it is preferred to prohibit the 3-4 upshift if the turbine speed sensor 305 is out of order.

For downshifts such as a 2-1 downshift and a 3-1 downshift which are accompanied by gradually unlocking the 2-4 brake 54 or the 3-4 clutch 53 to cause the ring gear 34 of the first planetary gear mechanism 30 and the pinion carrier 43 of the second planetary gear mechanism 40 to gradually drop their speeds with an effect of spontaneously locking the one-way clutch 56. Consequently, it is possible to cause timely alternate lock and unlock between the 2-4 brake 54 or the 3-4 clutch 53, and the one-way clutch 56 without using a turbine speed and it is not necessary to prohibit the 2-1 downshift or the 3-1 downshift even if the turbine speed sensor 305 is out of order. For a 3-2 downshift, it is hard to cause timely alternate lock and unlock between the 2-4 brake 54 and the 3-4 clutch 53 without using a turbine speed and it is preferred to prohibit the 3-2 downshift if the turbine speed sensor 305 is out of order. That is, in this instance, because the brake release pressure line 221 is in communication with the 3-4 clutch pressure line 227 through the 3-4 shift valve 105, pressure are drained from the 2-4 brake 54 and the 3-4 clutch 53 simultaneously only by gradually changing the duty ratio of the second duty solenoid valve 122 from 0% to 10% to lock the 2-4 brake 54 and unlock the 3-4 clutch 53 simultaneously. However, practically, lock and unlock are not always timely alternated between the 2-4 brake 54 and unlock the 3-4 clutch 53 only by draining pressure simultaneously from the 2-4 brake 54 and the 3-4 clutch 53. According to settings of pressure for the 2-4 brake 54 and unlock the 3-4 clutch 53, there occurs lock of the 2-4 brake 54 before an occurrence of unlock of the 3-4 clutch 53 or vice versa, which leads to interlocking the two friction coupling elements or an abrupt rise in engine speed which is accompanied by shift shock. For this reason, it is always necessary even in the power-on state or in the power-off state to timely alternate lock and unlock between the 2-4 brake 54 and unlock the 3-4 clutch 53 by use of a turbine speed in any case where locking or unlocking one friction coupling element must be caused prior to unlocking or locking another friction coupling element, and consequently, it is preferred to prohibit the 3-2 downshift if the turbine speed sensor 305 is out of order.

The automatic transmission equipped with the control system of the invention is placed in desired gears according to scheduled gear shift control patterns of maps for each forward range. If it becomes impossible to detect which forward range is selected due to a fault of the inhibitor switch arrangement 311, proper gear shifts are hard to occur due to impossibility of proper selection of the gear shift control maps. In order to avoid such an improper gear shift control, it is usual as one of fail-safe measures to select a specific solenoid pattern for the third gear in which all duty solenoid valves 121–123 remain not actuated as shown in FIG. 7. This is because the third gear can barely continue to drive the vehicle forward and provides driving torque necessary to restart the vehicle and because the first to third duty solenoid valves 121–123 are operated in the solenoid pattern common to both third gear in the drive (D) range and reverse gear in the reverse (R) range, which makes it possible to restart the vehicle back as well as forward after a stop. However, always putting all of the duty solenoid valves 121–123 in the solenoid pattern for the third gear on the occasion of failures causes surplus rotation of the engine.

That is, it is out of the matter that the third gear is coercively provided by turning off all of the duty solenoid valves 121–123 as a result of an occurrence of failure of the inhibitor switch arrangement 311 while the vehicle is traveling at a low or a middle speed with the third gear in the drive (D) range or with the second gear in the second speed (S) range. However, when the third gear is coercively provided as a result of an occurrence of failure of the inhibitor switch arrangement 311 while the vehicle is traveling at a high speeds with the fourth gear in the drive (D) range, the engine speed rises in excess. In order to prevent such a problem, according to the automatic transmission control of the invention, the determination of reverse (R) range is effected only when the vehicle speed is lower than the threshold speed, for example 100 km/h, if the inhibitor switch arrangement 311 encounters an failure, and is skipped when the vehicle speed is higher than the threshold speed even if the inhibitor switch arrangement 311 encounters an failure. Consequently, while the vehicle is traveling at a high speed, a range in which the transmission is placed immediately before detection of an inhibitor failure, e.g. the drive (D) range in many cases, is held, and ordinary selection of a target gear is subsequently made according to the scheduled gear shift control map for the range. As a result, a gear with which the vehicle is traveling is held as it is, so as to prevent an excessive rise in engine speed. On the other hand, the determination of reverse (R) range is effected while the vehicle is traveling at a low speed, selection of the third gear is effected. As a result, the vehicle can continue to travel forward with the third gear and can restart back or forth after a stop. In other words, if the inhibitor switch arrangement 311 encounters an failure while the vehicle is traveling with the fourth gear at a high speed, the transmission remains placed in the fourth gear and is changed into the third gear common to forward and reverse traveling when the vehicle drops its speed to a specified speed.

The duty cycle determination is accompanied by an effect described below. An inertia phase is created by locking one of two specific friction coupling elements to cause a drop in turbine speed during an upshift. Further, an inertia phase is created by unlocking one of two specific friction coupling elements to cause a rise in turbine speed during a downshift in the power-on state and, however, by locking the other specific friction coupling element to cause a rise in turbine speed during a downshift in the power-off state. Accordingly, while the inertia phase is present, the friction coupling element which is locked or unlocked to provide a rise in turbine speed is put in a slipping state by means of feedback control of the locking pressure to the friction coupling element, which is realized by driving any one of the first to third duty solenoid valves 121–123 with a specified duty ratio. For example, when a duty solenoid valve 121-123 is driven with a duty ratio of, for example, 70%, the duty solenoid valve is applied with a voltage such that it remains actuated or turned on for 70% of one duty cycle and remains not actuated for 30% of one duty cycle. The duty cycle is set to approximately 50 Hz. As a result, the locking pressure to the friction coupling element yields a pressure oscillation between high and low levels following the duty cycle with an effect of being reflected on locking or unlocking operation of the friction coupling element, which is felt as vibrations by the driver and passengers.

Referring to FIG. 24, combinations of a friction coupling element which slips in the inertia phase and a duty solenoid valve for supplying pressure to the friction coupling element are summarized in Table IV for the power-on state and in Table V for the power-off state. In Tables IV and V, FWC, 3-4C, 2-4B and L/R indicate the forward clutch 51, the 3-4 clutch 53, the 2-4 brake 54 and the low-reverse brake 55, respectively. In Table V, a downshift to the first gear in the power-off state is a manual downshift in the low speed (L) range.

For a 1-2 upshift for example, the first duty solenoid valve 121 is duty-controlled to gradually increase brake apply pressure such that the 2-4 brake 54 is gradually locked as it slips. At this time, an oscillation of the brake apply pressure supplied by the first duty solenoid valve 121 is reflected on locking operation of the 2-4 brake 54. However, as shown in FIGS. 4 and 8 through 13, because the hydraulic control circuit 100 of the automatic transmission 10 is provided with the second accumulator 142 in communication with the pressure line 217 branching off from the pressure line 214 which is brought into communication with the brake apply pressure line 215 through the low-reverse valve 1.03, the oscillation of the brake apply pressure supplied to the 2-4 brake 54 is reduced by the second accumulator 142. The pressure oscillation reducing effect through the second accumulator 142 is attained during other gear shifts, as well as the 1-2 upshift, for which the first duty solenoid valve 121 is controlled such that the 2-4 brake 54 is gradually locked as it slips. This pressure oscillation reducing effect is also attained during a manual downshift to the first gear in the low speed (L) range for which the first duty solenoid valve 121 is controlled in the inertia phase such that the low-reverse brake 55 is gradually locked as it slips by bringing the pressure line 214 into communication with the low-reverse brake pressure line 216 through the low-reverse valve 103 with its spool placed to the left end position.

For a 1-3 upshift for example, the second duty solenoid valve 122 is duty-controlled to gradually increase 3-4 clutch locking pressure such that the 3-4 clutch 53 is gradually locked as it slips. In this instance, because the brake release pressure line 221 is in communication with the 3-4 clutch pressure line 227 through the 3-4 shift valve 105, brake release pressure is provided as well as 3-4 clutch locking pressure by the second duty solenoid valve 122 and supplied to the brake release pressure chamber 54b of the 2-4 brake 54. Further, brake apply pressure is provided by the first duty solenoid valve 121 and supplied to the brake apply pressure chamber 54a of the 2-4 brake 54 through the brake apply pressure line 215. Consequently, the 2-4 brake 54 is not locked, and then, the brake apply pressure line 215 is brought into communication with the brake release pressure line 221 or the 3-4 clutch pressure line 227 through the 2-4 brake 54 with an effect of causing mutual influence between the brake apply pressure and the brake release pressure or the 3-4 clutch locking pressure. Consequently, oscillation of the 3-4 clutch locking pressure generated by the second duty solenoid valve 122 is reduced by the second accumulator 142 through the 2-4 brake. This pressure oscillation reducing effect is also attained during other gear shift, as well as the 1-3 shift, for which the second duty solenoid valve 122 is controlled in the inertia phase such that the 3-4 clutch 53 is gradually locked as it slips. However, for a 4-2 or a 4-3 downshift in the power-off state for which the third duty solenoid valve 123 is duty-controlled to gradually increase forward clutch locking pressure such that the forward clutch 51 is gradually locked as it slips, the pressure oscillation reducing effect by the second accumulator 142 is not attained directly nor indirectly. That is, the first solenoid valve 111 remains turned off at the beginning of any downshift, as a result of which the forward clutch pressure line 219 is shut off from communication with the brake release pressure line 221 by the 3-4 shift valve 105 and the third duty solenoid valve 123 generates forward clutch locking pressure to lock the forward clutch 51. Consequently, the pressure oscillation reducing effect by the second accumulator 142 is not attained. In particular, for a 4-2 jump downshift, a change in turbine speed before and after the 4-2 downshift is greater as compared with a 4-3 downshift and, consequently, it takes a long shift time relative to the 4-3 downshift, pressure oscillation is enhanced and easily felt by the driver and passengers. While the forward clutch pressure line 219 is shut off from the brake release pressure line 221 and is simultaneously brought into communication with the first accumulator 141 through the pressure line 210. Since this first accumulator 141 is provided only for the purpose of charging pressure in the forward clutch pressure line 219 beforehand to avoid a delay of locking operation of the forward clutch 51 and consequently has only a small rated capacity, it is unsuitable for the purpose of preventing pressure oscillation. Providing an extra accumulator in the hydraulic control circuit 100 for the purpose of preventing pressure oscillation caused during a 4-2 shift in the power-off state increases the size and costs of the hydraulic control circuit 100, which is always undesirable.

In view of the above, in order for the automatic transmission control system of the invention to assure the pressure oscillation reducing effect by the second accumulator 142, the high duty cycle of, for example, 85 Hz with which the third duty solenoid valve 123 is driven only for causing the 4-2 jump downshift in the power-on state while the oil temperature and the battery power level are lower than the threshold values, respectively. Driving the third duty solenoid valve 123 with the high duty cycle of, for example, 85 Hz the amplitude of pressure oscillation, which reduces vibrations felt by the driver and passengers. Since driving a duty solenoid valve with a high duty cycle affects its durability, it is preferred to avoided attainment of a pressure oscillation reducing effect by the second accumulator 142. For this reason, the third duty solenoid valve 123 is driven with the high duty cycle of 85 Hz only for the 4-2 jump downshift in the power-on state which takes a relatively long shift time. A 4-3 downshift in the power-on state for which a pressure oscillation reducing effect by the second accumulator 142 is not attained takes a relatively short shift time, as a result of which the third duty solenoid valve 123 can be driven with the ordinary duty cycle of, for example, 50 Hz. The reason why the high duty cycle is not selected while the oil temperature is low is that working oil at low temperatures has a high viscosity and is hard to cause pressure oscillation. The reason why the high duty cycle is not selected while the battery power level is low is that the duty solenoid valve is possibly hard to provide a desired level of pressure when driven with the high duty cycle.

It is to be understood that although the present invention has been described with respect to preferred embodiments thereof, various other embodiments and variants may occur to those skilled in the art, which are within the spirit and scope of the present invention, and such other embodiments and variants are intended to be covered by the following claims.

What is claimed is:

1. A control system for an automatic transmission of the type having a transmission gear mechanism and a plurality of hydraulically operated friction coupling elements which are selectively locked and unlocked to change a power transmission path including a one-way clutch so as to cause the automatic transmission to provide desired available gear shifts according to scheduled gear shift patterns defined based on vehicle driving conditions and which includes at least a first hydraulically operated friction coupling element provided with a single pressure chamber, a second hydraulically operated friction coupling element provided with locking and unlocking pressure chambers which is locked while only said locking pressure chamber is supplied with pressure and a third hydraulically operated friction coupling element provided with a single pressure chamber in communication with said unlocking pressure chamber of said second hydraulically operated friction coupling element, said available gear shifts including a first group of gear shifts which include at least one of gear shifts comprising an up-shift from a first gear achieved by locking said first hydraulically operated friction coupling element only to a second gear achieved by locking said first hydraulically operated friction coupling element and said second hydraulically operated friction coupling element, a down-shift from said second gear to said first gear, an up-shift from said first gear to a third gear achieved by locking said first hydraulically operated friction coupling element and said third hydraulically operated friction coupling element and a down-shift from said third gear to said first gear, all of which are accompanied by operation of said one-way clutch, and also comprising an up-shift from said second gear to said third gear, and a second group of gear shifts which include at least a down-shift from said third gear to said second gear, said automatic transmission control system comprising:

driving condition detection means for detecting driving condition of the vehicle;

speed detection means for monitoring an input speed of rotation to said automatic transmission;

hydraulic control means for hydraulically locking and unlocking said hydraulically operated friction coupling elements to provide one of said available gear shifts; and control means for determining one of said available gear shifts which said automatic transmission provides according to said scheduled gear shift pattern selected based on said driving condition, detecting a failure of said speed detecting means based on said input speed of rotation, controlling said hydraulic control means so as to prohibit an occurrence of said second group of gear shifts while permitting an occurrence of said first group of gear shifts when detecting said failure, and controlling a timing at which two of said first to third hydraulically operated friction coupling elements are locked and unlocked, respectively, or vice versa during an occurrence of a gear shift of each said group according to an input speed of rotation detected by said speed detecting means while not detecting said failure.

2. A control system for an automatic transmission of the type having a transmission gear mechanism and a plurality of hydraulically operated friction coupling elements which are selectively locked and unlocked to change a power transmission path including a one-way clutch so as to cause the automatic transmission to provide desired available gear shifts according to scheduled gear shift patterns defined based on vehicle driving conditions and which includes at least a first hydraulically operated friction coupling element provided with a single pressure chamber, a second hydraulically operated friction coupling element provided with locking and unlocking pressure chambers which is locked while only said locking pressure chamber is supplied with pressure and a third hydraulically operated friction coupling element provided with a single pressure chamber in communication with said unlocking pressure chamber of said second hydraulically operated friction coupling element, said available gear shifts including a first group of gear shifts which include at least one of gear shifts comprising an up-shift from a first gear achieved by locking said first hydraulically operated friction coupling element only to a second gear achieved by locking said first hydraulically operated friction coupling element and said second hydraulically operated friction coupling element, a down-shift from said second gear to said first gear, an up-shift from said first gear to a third gear achieved by locking said first hydraulically operated friction coupling element and said third hydraulically operated friction coupling element and a down-shift from said third gear to said first gear, all of which are accompanied by operation of said one-way clutch, and also comprising an up-shift from said second gear to said third gear, and a second group of gear shifts which include at least a down-shift from said third gear to said second gear, said automatic transmission control system comprising:

a driving condition detector for detecting driving condition of the vehicle;

a speed sensor for monitoring an input speed of rotation to said automatic transmission;

a hydraulic control circuit for hydraulically locking and unlocking said hydraulically operated friction coupling elements to provide one of said available gear shifts; and a controller comprising a microcomputer programmed to determine one of said available gear shifts which said automatic transmission provides according to said scheduled gear shift pattern selected based on said driving condition, to detect a failure of said speed sensor based on said input speed of rotation, to control said hydraulic control circuit so as to prohibit an occurrence of said second group of gear shifts while an occurrence of permitting said first group of gear shifts when detecting said failure, and to control a timing at which two of said first to third hydraulically operated friction coupling elements are locked and unlocked, respectively, or vice versa during an occurrence of a gear shift of each said group according to an input speed of rotation detected by said speed detecting means while not detecting said failure.

3. A control system for an automatic transmission of the type having a transmission gear mechanism and hydraulically operated friction coupling elements including at least first and second hydraulically operated friction coupling elements which are selectively locked and unlocked to provide desired available gear shifts according to vehicle driving conditions including an input speed of rotation of said transmission gear mechanism, said available gear shifts including an up-shift achieved by locking said first hydraulically operated friction coupling element and simultaneously unlocking said second hydraulically operated friction coupling element and a down-shift achieved by unlocking said first hydraulically operated friction coupling element and locking said second hydraulically operated friction coupling element, said automatic transmission control system comprising:

driving condition detecting means for detecting driving condition of the vehicle;

speed detection means for monitoring an input speed of rotation to said automatic transmission;

hydraulic control means for hydraulically locking and unlocking said hydraulically operated friction coupling elements to provide desired one of said available gear shifts according to said driving condition detected by said driving condition detection means; and control means for determining one of said available gear shifts which said automatic transmission provides according to said input speed of rotation, detecting a failure of said speed detecting means based on said input speed of rotation, controlling said hydraulic control means so as to prohibit an occurrence of said down-shift of said automatic transmission while permitting an occurrence of said up-shift when detecting said failure.

* * * * *